US006333968B1

(12) United States Patent
Whitlock et al.

(10) Patent No.: US 6,333,968 B1
(45) Date of Patent: Dec. 25, 2001

(54) TRANSMISSION CATHODE FOR X-RAY PRODUCTION

(75) Inventors: Robert R. Whitlock, Bethesda; Michael I. Bell, Rockville, both of MD (US); David V. Kerns; Sherra Kerns, both of Waltham, MA (US); Jimmy L. Davidson, Brentwood; Weng Poo Kang, Nashville, both of TN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/566,239

(22) Filed: May 5, 2000

(51) Int. Cl.$^7$ ........................................ H01J 9/12
(52) U.S. Cl. ..................... 378/136; 378/122; 313/320; 445/46
(58) Field of Search ................... 378/136, 121, 378/119, 137, 44, 122, 140; 313/147, 309, 310, 311; 445/46

(56) References Cited

U.S. PATENT DOCUMENTS

| 4,627,008 | * | 12/1986 | Doucet et al. | 378/122 |
|---|---|---|---|---|
| 4,874,981 | | 10/1989 | Sewdt | 313/309 |
| 5,042,058 | | 8/1991 | Rentzepis | 378/122 |
| 5,335,258 | | 8/1994 | Whitlock | 378/122 |
| 5,444,242 | * | 8/1995 | Larson et al. | 250/305 |
| 5,563,929 | | 10/1996 | Connolly et al. | 378/51 |
| 5,602,894 | | 2/1997 | Bardash | 378/87 |
| 5,717,204 | * | 2/1998 | Meisburger et al. | 250/310 |
| 5,742,658 | | 4/1998 | Tifflin et al. | 378/44 |
| 6,259,765 | * | 7/2001 | Baptist | 378/136 |

FOREIGN PATENT DOCUMENTS

WO98/44529   8/1998   (WO) .

OTHER PUBLICATIONS

Kang et al.; Subvolt Turn–On Voltage Self–Align Gate Diamond Emitter Fabricated by Self–Align–Gate–Sharpened Molding Technique; J. Vac. Sci. Tech; vol. 17B; No. 2; pp. 740–743; Mar./Apr. 1999.

Kang et al.; Ultralow—Voltage Boron–Doped Diamond Field Emitter Vacuum Diode; IEEE Elect. Device LTTR; vol. 19, No. 10; pp. 379–381; Oct. 1998.

Science; Field Emitters Finding Home in Electronics; vol. 281; pp. 632–633; Jul. 1998.

Boettinger et al.; X–Ray Manifier; Rev. Sci. (Netrum; vol. 50; No. 1, pp. 26–30; Jan. 1979.

(List continued on next page.)

Primary Examiner—Drew Dunn
(74) Attorney, Agent, or Firm—John J. Karasek; John G. Mills

(57) ABSTRACT

The transmission cathode for X-ray generation is a device wherein an electrical current generated by a low voltage power supply produces an electron flow from the transmission cathode that is accelerated by a high voltage power supply towards an anode where X rays are emitted on impact. As the X rays are emitted, a primary beam passes through the cathode striking a sample placed outside the tube. The transmission cathode is X comprised of an electron emitter structure, preferably, an electron field emitter diode or thermionic emitter or a photoemitter or a nanotube or a pyroemitter or a piezoemitter, fabricated, preferably of elements of atomic numbers of 14 (silicon) or below, with electrically conductive components or conductive mechanical structural components, preferably, conductive silicon or diamond or aluminum or beryllium metal, and non-conductive electrical insulators or non-conductive mechanical structural components, preferably, diamond or silicon dioxide or boron carbide. The transmission cathode is transmissive to those X rays that freely flow through the transmission cathode.

37 Claims, 19 Drawing Sheets

OTHER PUBLICATIONS

Connolly et al.; On–Line Measurement of Sub–PPB Levels of Metals Using X–Ray Fluorescence; Detora Analytical, Inc.; Ultrapure Water; pp. 53–57; Mar. 1998.

Tang et al.; Plava Lenses for Field–Emitter Arrays: Voc. Sci. Technol. vol. B13, No. 2, pp. 571–575; Mar./ADR 1995.

Kava et al.; Subvolt Turn–On Voltage Self–Avon Gate Diamond Emitter Fabricated by Self–Augu Gate Sharpened Molding Technique; J. Vac. Sci. Technol., b Bol. 17, No. 2; pp. 740–743; Mar./Apr. 1999.

Kang et al., Ultrflow–Voltage Baron–Doped Diamond Field Emitter Vacuum Diode, IEEE Elec. Jev. Ltrs. vol. 19, No. 10, pp. 379–381, Oct. 1988.

Boettivrer et al., X–Ray Magnifier, Rev. Sci. Instrum., vol. 50, No. 1, pp. 26–30, Jan. 1979.

Normile, Field Emitters Finding None in Electronics, Science, vol. 281, pp. 632–633, Jul. 1998.

* cited by examiner

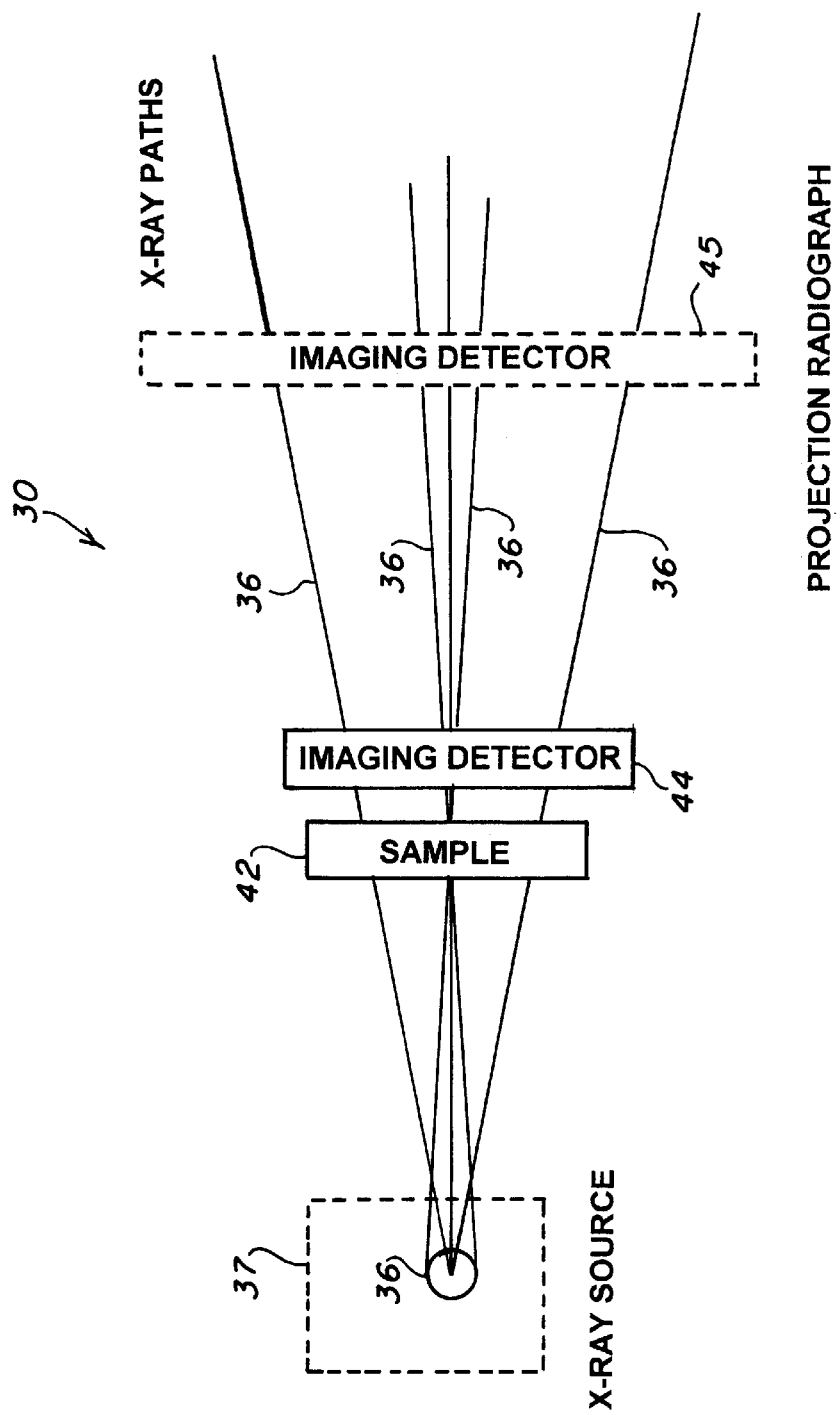

TRANSMISSION CATHODE FOR X-RAY PRODUCTION

BACKGROUND OF THE INVENTION

1. Field of the Invention

This device pertains generally to a device for generating X rays and more specifically to an X-ray transmission cathode wherein the X rays produced in an evacuated X-ray tube by an anode or sample are allowed to exit the tube through the cathode.

2. Description of the Related Art

The typical configuration for a sealed X-ray tube involves a resistively heated, drawn wire filament cathode for generating free electrons in vacuum, and a metallic anode held at high voltage with respect to the cathode. The emitted electrons are electrostatically accelerated to high energy and made to collide with the anode, which then emits the X rays. The voltages required for economical X-ray emission exceed the binding energy of inner electrons in the atoms of the anode, typically kilovolts. The anode emits continuum bremstrahlung X rays as well as characteristic X rays. Emission occurs in all directions, but the intensity in any direction is modified by the absorption of the X rays as they depart their points of origin. The characteristic rays are distinctive for each of the chemical elements, and form the basis of the well known elemental analysis by X-ray emission. Selective detection, processing, and display techniques have been used to record the characteristic rays and analyze the spatial variations of composition in X-ray emitting materials.

As used herein, an x ray photon is a photon with sufficient energy to ionize a neutral atom by photoelectric absorption. There is a wide variation in the energy range of ionizing photons.

The usual geometry for sealed X-ray tubes 10, as shown in FIG. 1a, includes a filament cathode 12, an anode 14, and a separate X-ray "window" 16 made of thin material, usually metal, through which the X rays 18 exit the vacuum sealed X-ray tube 10. It is well understood in the art that a fraction of incident x rays 18 are absorbed by any X-ray transmitting window 16 material such as a window 16, and that the suitability of a material as a window 16 is enhanced for smaller magnitudes of that fraction. The filament cathode 12 is connected between a pair of terminals 13 and 17, to a cathode low voltage power supply 22 which supplies current to the cathode 12 to heat the filament cathode 12 and excite electron flow 15. A high voltage power supply 24 is connected to the anode 14 to accelerate the flow of the emitted electrons 15. In this design, the anode 14 placement and shape is subject to two major geometric constraints, (1) maintaining sufficient distance between the anode 14 and other items that the electric fields within the vacuum sealed X-ray tube 21 remain low enough to preclude breakdown and surface currents, and (2) insuring that the window 16 placement is such that X rays 18 are afforded sufficient solid angle to reach the outside of the vacuum sealed X-ray tube 21 with acceptable levels of absorption.

Typical vacuum sealed X-ray tube 10 design of the prior art places the sample or X-ray target 23 and window 16 such that X rays 18 are emitted at or near 90 degrees from the path of the incident electrons. Because X rays are less strongly absorbed than the electrons, angles are commonly chosen such that the electron penetration distance in the anode 14 is shorter than the exit path for emitted X rays 18. X-ray 18 takeoff angles of 6 to 30 degrees (from the surface of the anode 14) are not uncommon; appreciable X-ray absorption in the anode 14 occurs at these low angles.

A variant among tube designs of the prior art is the transmission anode, end window, tube 20, as shown in FIG. 1b, commonly known as the end-window tube, in which the transmission anode 26 functionalities of an anode and a window are combined in a single member. A transmission anode 26 must allow the electrons 29 to strike the anode 26 to produce X rays 31, dissipate charge and heat from its surfaces and from throughout its volume, and permit the X rays 31 to pass through to the outside; these requirements are usually achieved with transmission anodes 26 made of thin metal foils. The transmission anode, end-window tube 20 is advantageous in some applications, but the requirement for a thin anode 26 results in lower X-ray 31 output power. It is quite common for the end-window anode 26, an exterior component, to be held at ground potential, which leads to the requirement for the cathode 33 portion to be at high voltage. The cathode filament current power supply 34 must float at high negative voltage while the anode 26 is connected to a tube high voltage power supply 32 to accelerate the flow of emitted electrons 31.

In contrast to tube designs of the prior art shown in FIGS. 1a and 1b, the transmission cathode, end-window, tube discussed below, enables the X rays 31 from the transmission cathode 33 to exit the anode 26 at the same angle that the electrons 29 are incident, thus reducing the X-ray absorption and enhancing tube 2 output and permitting grounded exterior components. The transmission cathode 33 is not bombarded by high energy electrons and need not dissipate as much charge or heat from within its volume, thus it need not be as good a volume conductor of either.

While the hot filament cathode based on thermionic emission is very common, alternative technologies based on field emission, photo emission, and plasma emission have been investigated as well. Field emission tips have been used for X-ray production in the past on radiography machines to produce nanosecond pulses of X rays by accelerating electrons from an array of emitters into a metal foil end-window anode. Photoemission involves irradiating the cathode with suitable light sources capable of stimulating the cathode to emit electrons. SEE, U.S. Pat. No. 5,042,058, Rentzepis, issued Aug. 20, 1991, entitled ULTRASHORT TIME-RESOLVED X-ray SOURCE. Plasma emission cathodes involve locally heating the cathode surface to temperatures sufficient to produce a plasma, from which electrons are emitted. SEE, U.S. Pat. No. 5,335,258, Whitlock, issued Aug. 2, 1994, entitled SUBMICROSECOND, SYNCHRONIZABLE X-ray SOURCE.

Spatial resolution based on direct X-ray emission has been practiced with the electron microprobe and scanning electron microscope. Fluorescent X-ray emission has also been used for compositional mapping. SEE, U.S Pat. No. 5,742,658, Tiffin et al., issued Apr. 21, 1998, entitled APPARATUS AND METHOD FOR DETERMINING THE ELEMENTAL COMPOSITIONS AND RELATIVE LOCATIONS OF PARTICLES ON THE SURFACE OF A SEMICONDUCTOR WAFER.

The focusing and collimation of arrays of micro electron sources has been well documented. SEE, U.S. Pat. No. 4,874,981, Spindt, entitled AUTOMATICALLY FOCUSING FIELD EMISSION ELECTRODE, and Cha-mei Tang ET AL.; PLANAR LENSES FOR FIELD-EMITTER ARRAYS; J. Vac. Sci. Technol. B 13(2), March/April 1995, pp. 571–575.

Due to the unavailability of lenses for X rays, geometric imaging means are commonly used to generate X-ray images. X radiography 30, as shown in FIG. 1c, in which a sample 42 is imaged with X-rays 38, typically uses point projection imaging. A small ("point") source of X-rays 36 emits X-rays 38 spherically outward through the exit window of the tube (not shown). The sample 42 to be radiographed is placed between the X-ray source 36 and the imaging detector 44, e.g., an X-ray film plate used for medical imaging. The spatial resolution of the image is limited by the size of the X-ray point source 36. The achievable X-ray output power cannot exceed the ability of the X-ray tube 37 to absorb the heat load of its internal electron beam within the small focal point from which the X-rays 38 emanate. Where the sample is in close proximity to or contacting the imaging detector (typically X-ray film), the arrangement is called contact radiography and unit magnification is achieved. In typical applications where a magnified image is required, this can be obtained by moving the image plane further from the source and the image becomes a projection radiograph 45. This, in turn, increases the X-ray flux required to achieve an exposure, and places greater demands on the X-ray tube (not shown) and power supply.

Areal X-ray sources are not widely used for imaging, as the common filament cathode X-ray tubes are most conducive to providing small X-ray sources.

X-ray windows must transmit X rays, maintain vacuum integrity as essential to the electron trajectories, and, if needed, allow for the dissipation of charge or heat. The cathodes taught in the prior art do not satisfy these requirements and are insufficiently transmissive to X rays to permit their use as an X-ray window.

SUMMARY OF THE INVENTION

The objective of this invention is to provide a device for X-ray production wherein the X rays are transmitted out of the device through the cathode.

Another objective of the invention is to provide an areal X-ray source for X-ray fluorescence (XRF) system applications.

Another objective of the invention is to provide an areal X-ray source for X-ray emission analysis applications.

Another objective of the invention is to provide an areal cathode with addressable elements in an X-ray source for use with a compositionally structured anode for the generation of tailored X-ray spectra.

Another objective of this invention is to provide an areal X-ray source for use with compositionally structured samples, for use as an electron probe system.

Another objective of the invention is to provide an areal X-ray source for use with compositionally structured samples, for use with a collimator as an imaging electron probe system.

Another objective of the invention is to provide a cathode with addressable elements in an X-ray source for use with compositionally structured samples, for use as a imaging electron probe system.

Another objective of the invention is to provide a cathode with addressable elements for use with topographically or compositionally structured samples, for use as an scanning electron imaging system.

Another objective of the invention is to provide an areal X-ray source for use with a collimator for radiography applications.

These and other objectives are achieved by the use of a transmission cathode in an device for generating X rays. In the device an electrical current generated by a low voltage power supply produces an electron flow from the transmission cathode that is accelerated by a high voltage and propagates to an anode. As the X rays are emitted, a primary X-ray beam passes through the cathode striking a sample placed outside the tube. The transmission cathode is comprised of an electron emitter structure, preferably, a electron field emitter diode or thermionic emitter or a photoemitter or a nanotube or a pyroemitter or a piezoemitter, fabricated, preferably of elements of atomic numbers of 14 (silicon) or below, with electrically conductive components or with conductive mechanical structural components, preferably, conductive silicon or diamond or aluminum or beryllium metal, and non-conductive electrical insulators or non-conductive mechanical structural components, preferably, diamond or silicon dioxide or boron carbide.

BRIEF DESCRIPTION OF THE DRAWINGS

FIG. 1c shows x radiography using point projection imaging with a point source X-ray tube, typical of the prior art.

DESCRIPTION OF THE PREFERRED EMBODIMENT

Figure 1A:
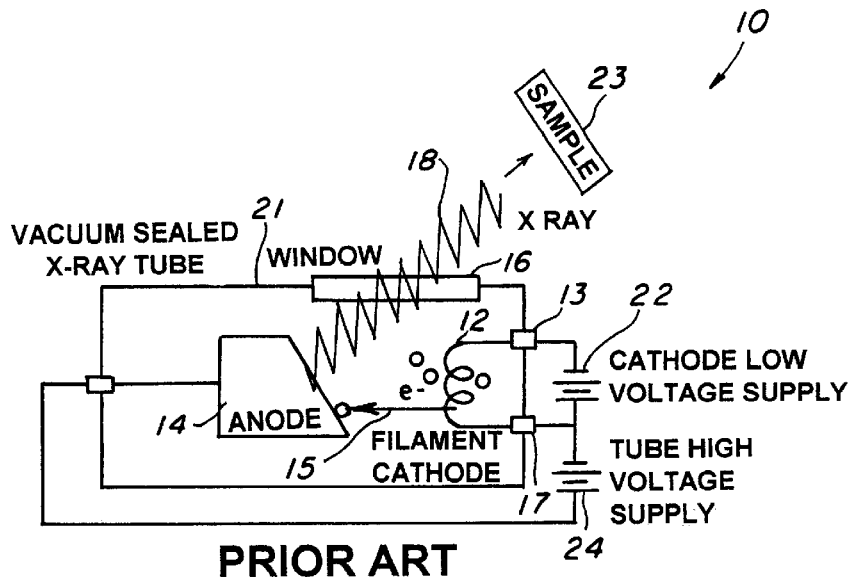
FIG. 1a shows a sealed, evacuated X-ray tube typical of the prior art.
Figure 1B:
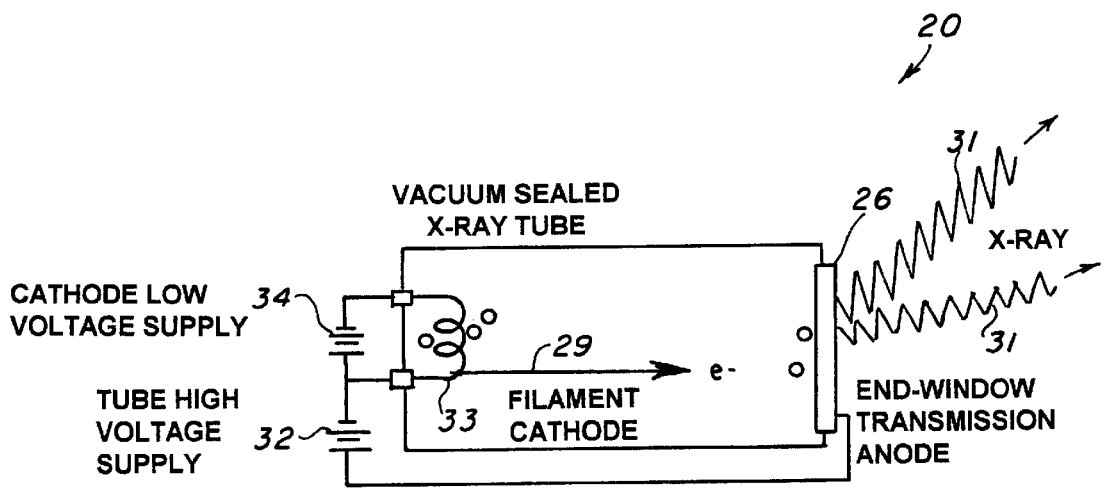
FIG. 1b shows an end-window, transmission anode tube typical of the prior art.
Figure 2A:
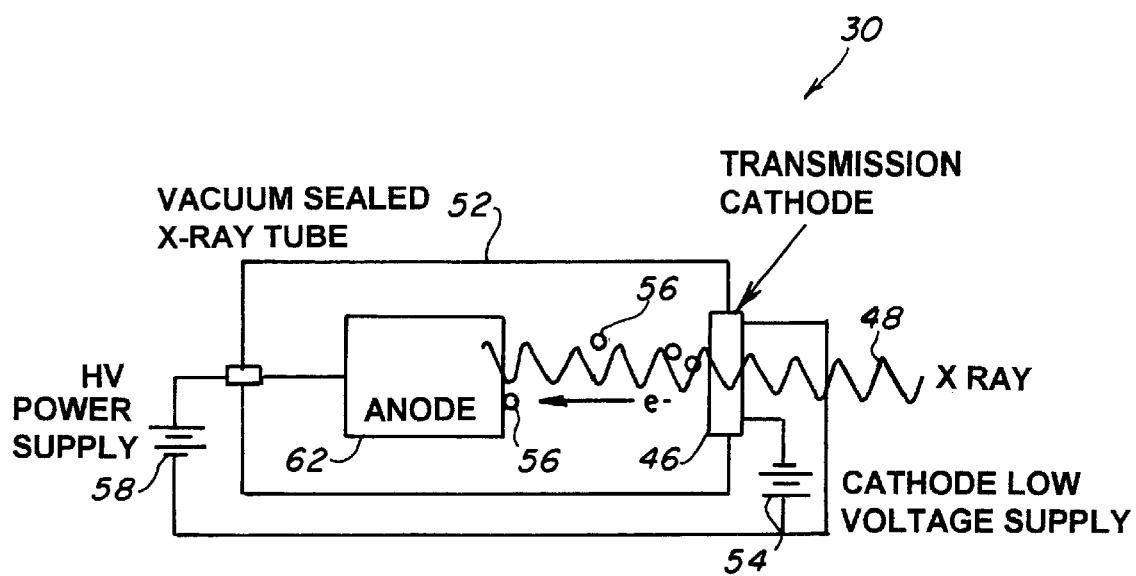
FIG. 2a shows a sealed, evacuated X-ray transmission cathode device as described in the preferred embodiment.

In the preferred embodiment of the transmission cathode tube 30, as shown in FIG. 2a, an X-ray transmission cathode 46 is so designed that X-rays 48 produced within an evacuated, sealed X-ray tube 52 or pumped tube, are allowed to exit the tube 52 through the cathode 46. The X-ray transmission cathode 46 emits electrons supplied by a low voltage power supply 54. Electrons 56 emitted by the transmission cathode 46 are accelerated by high voltage applied by a high voltage power supply 58 and impact the anode 62 to produce X-rays. The X-rays are emitted in all directions from the point of impact. X-rays 48 that strike the tube wall 52 are heavily absorbed. X-rays 48 that strike the transmission cathode 46 are transmitted and thus are emitted outside the tube 52.

Typical uses of an X-ray tube with transmission cathode 46 includes X-ray fluorescence (XRF) analysis, X-ray emission analysis, X-radiography (i.e., X-ray imaging), and X-ray diffraction. Further use of the scanning cathode array is found in the area of electron imaging systems.

A technologically simple configuration of known elements, combined to achieve a similar tube geometry, involves a free standing thermionic emission filament cathode disposed between an X-ray window and an anode. This device is distinct from all transmission cathode devices taught herein, in that the cathode (electron source) and window functionalities are not coalesced into a single item. The thermionic filament, which is operated at high temperature in proximity to the window, would quickly contaminate the window with evaporant and reduce its X-ray transmissivity. The filament cathode would produce a shadow image in the emitted x rays, which would be of concern, for example, if it produced image contrast and fell within the imaging field of a radiographic system or monochromatic beam used for diffraction. The free standing filament cathode does not achieve the respective advantages taught below for transmission cathodes. The filament cathode is not an areal cathode, and does not achieve the respective advantages taught below for transmission cathodes. In addition, the free standing filament cathode is not addressable, gatable, or scannable, and does not achieve these respective advantages taught below for transmission cathodes.

Figure 2B:
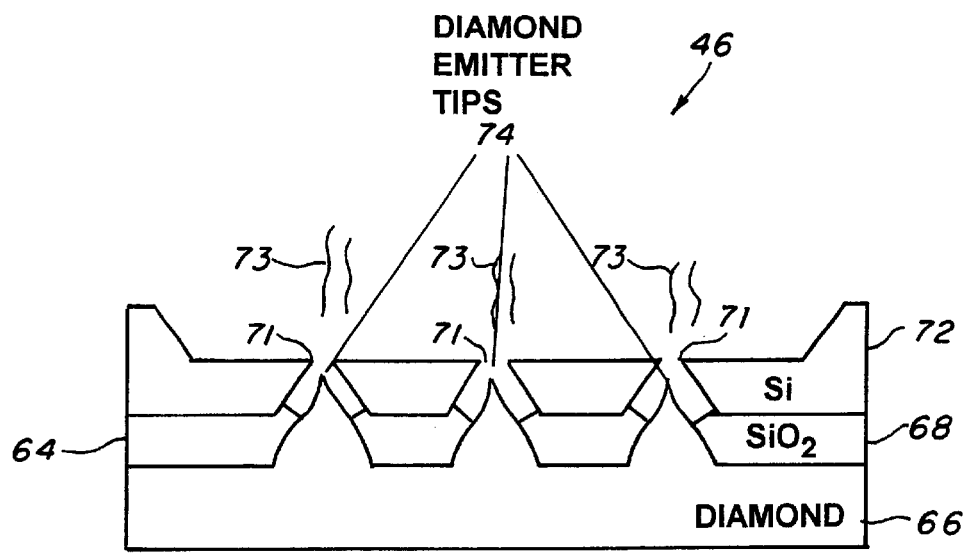
FIG. 2b shows a cross sectional view of a transmission cathode.
Figure 2C:
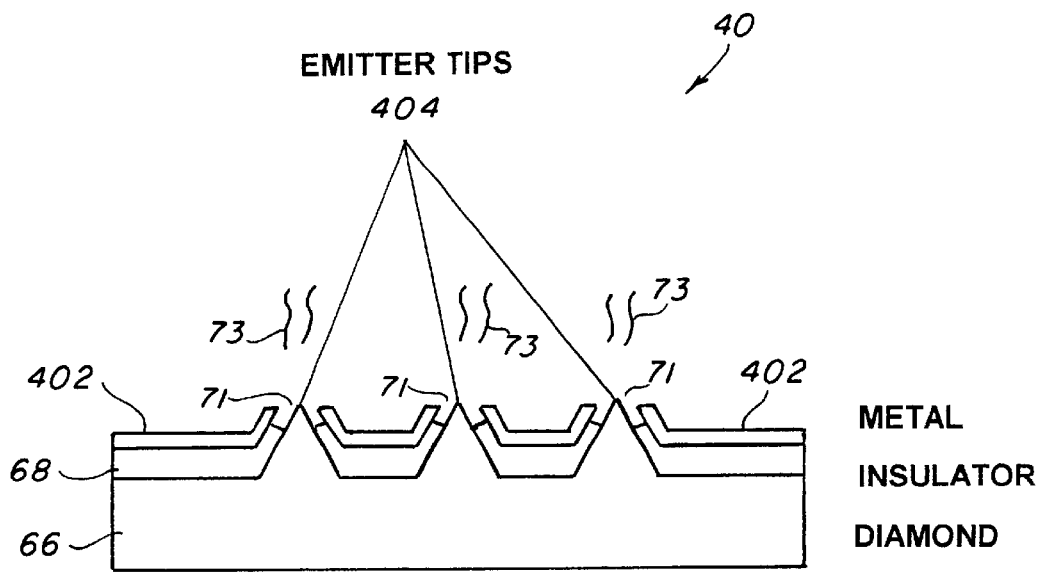
FIG. 2c shows a cross section of another transmission cathode.

Referring to FIG. 2b, the transmission cathode 46 is comprised of an electron emitter 64 structure, preferably, a film forming a diamond field emitter 66, vapor deposited on a pre-molded structure on silicon forming a positive electrode 72 or on a thin insulating layer 68 approximately 1.0 $\mu$m thick, preferably $SiO_2$ on a conductive mold to shape the emitter tips 72 during processing, preferably microfabricated highly doped <100> silicon. SEE, Kang et al., "SUB-VOLT TURN-ON VOLTAGE SELF-ALIGN GATE DIAMOND EMITTER FABRICATED BY SELF-ALIGN-GATE-SHARPENED MOLDING TECHNIQUE", J. Vac. Sci. Technol. B, vol. 17 no. 2, March/April 1999, p. 740–3. The diamond film 66 is intentionally deposited with a small component of $sp^2$ chemical bonding content. The silicon 72 mold is partially etched away to reveal the diamond emitter tips 74. The heavily doped silicon mold 72 is used as the positive electrode of the electron emitter, that is, applying a positive potential to the silicon 72 with respect to the diamond 66 results in electron emission by the diamond tips 74 into the space above the openings in the positive electrode. The diamond field emitter 66 may be fabricated to a thickness and geometry to provide its own support, in which case an additional structural holder 64 is not required. However, other elements, including metal conducting layers, doping layers, and other electron emitter designs may be used in variant electron emission designs, provided as they meet the criterion of being transmissive to X rays. FIG. 2c illustrates a novel transmission cathode 40 with a metal layer forming the positive electrode 402 of the electron emitter 404.

Figure 2D:
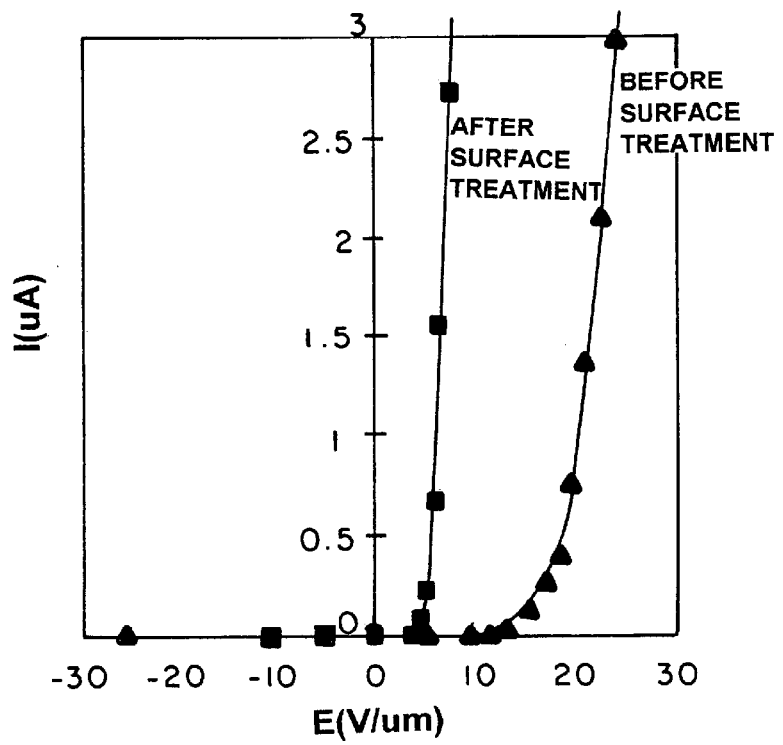
FIG. 2d shows the threshold voltage for a gatable diamond electron field emitter of the transmission cathode.
Figure 2E:
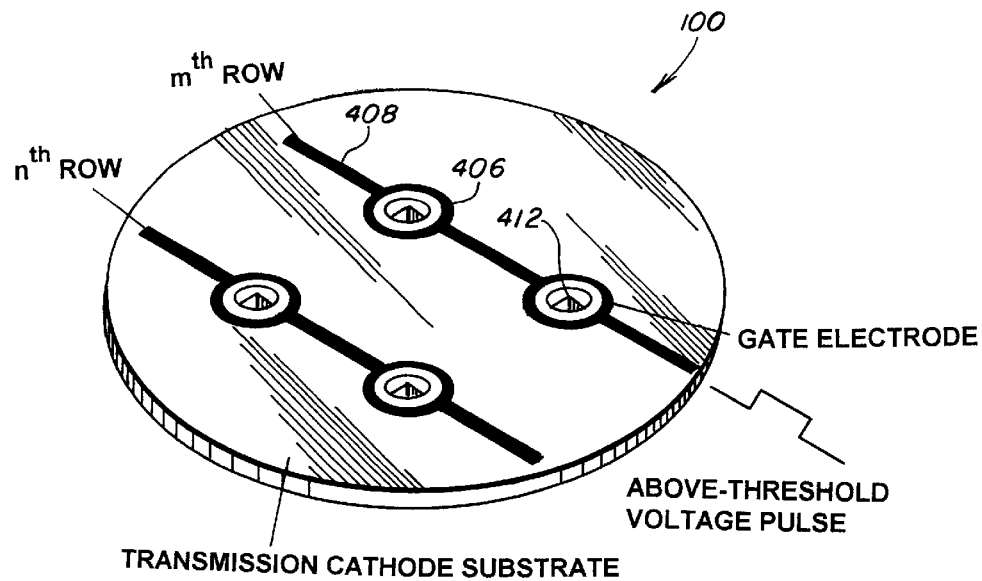
FIG. 2e shows one manner in which the addressing of a selected row of gatable electron sources within an array of electron sources may be accomplished.

Electron emitters of many types, including field emitters, release electrons with a low energy per electron. This is illustrated in FIG. 2d, in which the threshold for emission by diamond field emitters is presented. Diamond field emitters without a surface treatment 74 are seen to require a higher value of voltage per micrometer (and therefore a higher threshold voltage) than do diamond field emitters that have undergone a surface treatment 76. The surface treated diamond field emitters 76 have a desirably low threshold voltage. The low voltage at which electrons are emitted by diamond field emitters and other electron emitters allows the individual emitter to be gated on or off by application of a suitable voltage to a gate electrode. Referring again to FIG. 2c, an above-threshold voltage may be applied to all emitters 404 simultaneously causing them all to emit. By selectively applying an above-threshold voltage to certain emitters 404 and not others, the chosen emitters 404 may be induced to emit while the others do not emit. For example, in FIG. 2e is shown an arrangement of gate electrodes 406 that permits a selected row of emitters 408 within the array of emitters 100 to be addressed and gated ON. A voltage, exceeding the threshold voltage, is applied to the selected row 408 and emitters 412 within that row 408 will emit electrons. Other arrangements or groupings of emitters 406 may be designed to be selectable, for example by hard wiring the gate electrodes 406 into arrangements or groupings or by controllably switching interconnections between gate electrodes 406.

Figure 2F:
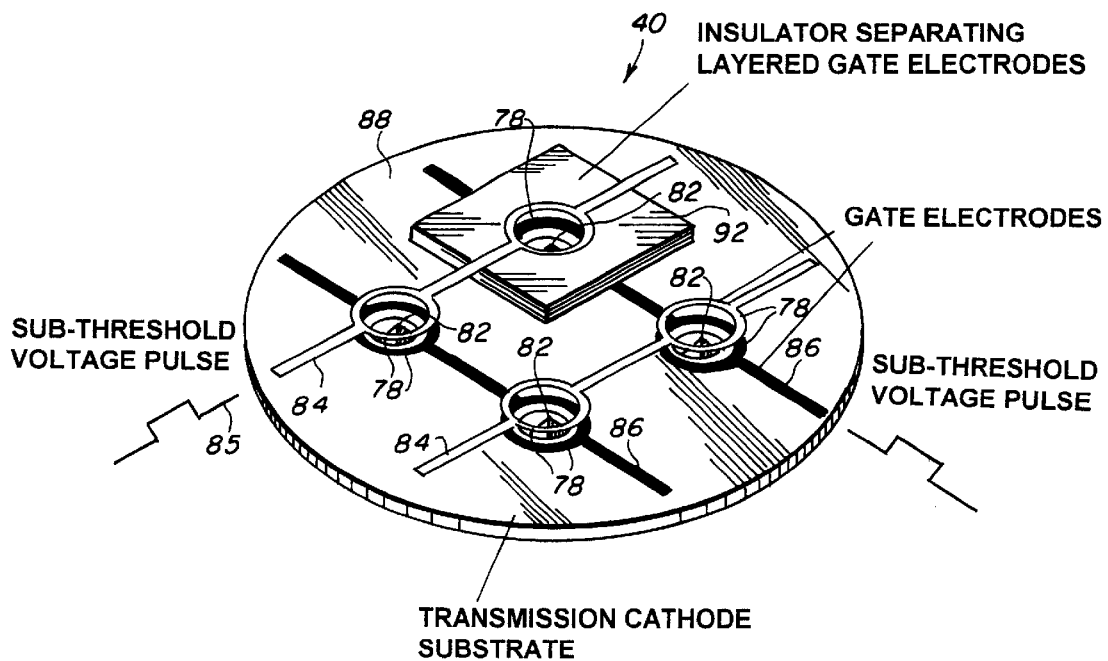
FIG. 2f illustrates one manner in which the addressing of individual gatable electron sources within an array of electron sources may be accomplished.

For the emitters 40, as shown in FIG. 2d, the change from nonemitting to emitting conditions occurs abruptly. For an applied gate voltage of half the threshold voltage, electron emission remains suppressed. In FIG. 2f is shown an arrangement of gate electrodes 78 that permits individual emitters 82 to be addressed and gated on. Two gate electrodes 78 are disposed above each addressable emitter 82. The gate electrodes 78 may be electrically connected in rows 84 and columns 86, as depicted in FIG. 2f. The rows 84 are separated from one another laterally by an insulating surface 92, and the columns 86 are separated from one another laterally by another insulating surface 88 which is depicted for convenience in illustration to be also the transmission cathode substrate 88. A sub-threshold voltage 85, less than the threshold voltage, is applied to each of the two gate electrodes 78 disposed above the desired emitter 82. The desired emitter 82 experiences a net voltage at or above the threshold, and emits a beamlet of electrons. The gate electrodes 78 of adjacent emitters 82 may also receive a voltage, but only one gate electrode 78 will experience a voltage at any emitter 82 other than the desired emitter, and thus only the desired emitter will exceed threshold. (Other geometric arrangements of a plurality of gate electrodes may be applied at each emitter 82, for example, three electrodes 78, with the adjacent electrodes 82 being electrically connected in lines at 60 degree angles-instead lines at 90 degree angles. Other addressing means may be employed, such as individually wired gates addressed by switching circuitry. Collimation and focusing of the beamlets may be achieved by suitably shaping the gate electrodes or by addition of supplementary electrodes.

The concept of gating and gate voltage, as used herein, includes binary switching OFF and ON. However, for emitters that increase output currents as gate voltage increases, the gate voltage provides a means for controlling the magnitude of the current. Thus, gating includes the capacity to exercise such control.

Features on the microfabricated cathodes 40 may be made of any suitable material, as dictated by the functionality required. For example, aluminum or other metal conducting paths or layers are admissible. The physical thickness of such conducting paths is very small, and the resultant X-ray absorption in them is not great locally, and even lower when averaged over the entire area of the cathode 40. Thus enhanced functionality can be acquired by adding structures of higher atomic number, while retaining a usefully low value of X-ray transmission through the full aperture of the transmission cathode 40.

There is a wide range of techniques for treating surfaces, processing materials, and fabricating structures, operating on length scales from the nanometer scale to the macro scale, which may be applied to the transmission cathode tube 40 or its components. These are well known to those skilled in the art.

The transmission cathode substrate 88 or window material may be any X-ray transmissive material satisfying the criteria set forth herein and durable to X-ray irradiation, such as thin metal, polyimide, nitrides, carbides, diamond, or silicon. Particular advantages may be achieved with substrates made of elements in the low atomic number range of 1 and 14 (hydrogen through silicon), due to the lower X-ray absorption, per atom, of low atomic number elements, and the fact that their absorption edges fall well below the energies used in most practical X-ray work.

Figure 3:
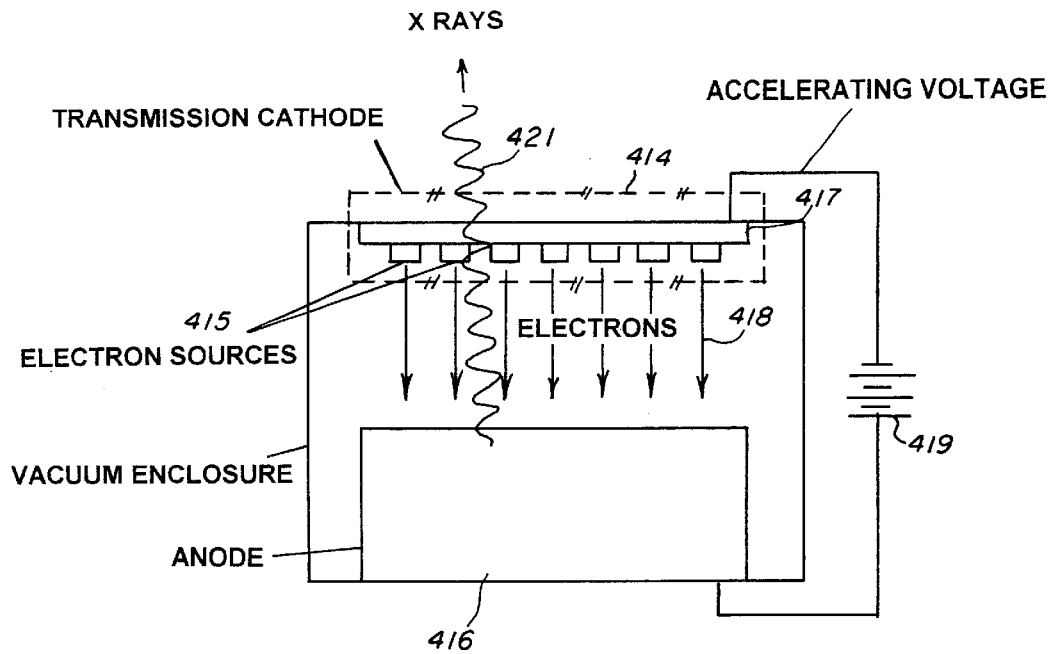
FIG. 3 shows a simple X-ray tube with an anode and a simple transmission cathode operating with an acceleration voltage.

Many advantages are inherent in the use of electron emitters having closely placed electrodes to perform the functions of electron extraction or gating. One of these advantages is the low voltages which may be applied to achieve the extraction or gating functions, a particularly important issue for devices controlled by solid state electronics. However, in X-ray applications for which high voltages are required to stimulate x ray production, it is not always required to employ low voltages or to incorporate these closely placed electrodes in order to achieve X-ray emission. FIG. 3 illustrates a fundamental X-ray tube configuration of a simple transmission cathode 414 and an anode 416, held in an environment suitable for electron 418 transit between the cathode 414 and anode 418. The transmission cathode 414 may be, for example, all diamond on which diamond emitter tips 415, or other types of electron sources, are formed as before but without overlays to form extraction or gate electrodes. Or, emitter tips 415, formed of any material that performs as an emitter, may be placed on an electrically conductive, X-Ray transmissive substrate 417, and occupying a feraction of the total area of that substrate. The emitter tips 415 may be made of the same material as the substrate 417, if that material performs as an emitter. This combination of emitter tips 415 and substrate 417 forms a transmission cathode 414. For sufficiently close spacings between emitter tips 415 and anode 416, the application of high voltage between the cathode414 and anode416 is sufficient to enable electron emission. Emission current may be gated by removing either the high voltage or the current supply. Emitted electrons 418 are accelerated to the anode 416, where they produce x rays 421. Emitted x rays 421 may transmit through the transmission cathode 414 and escape the X-ray tube.

Figure 4:
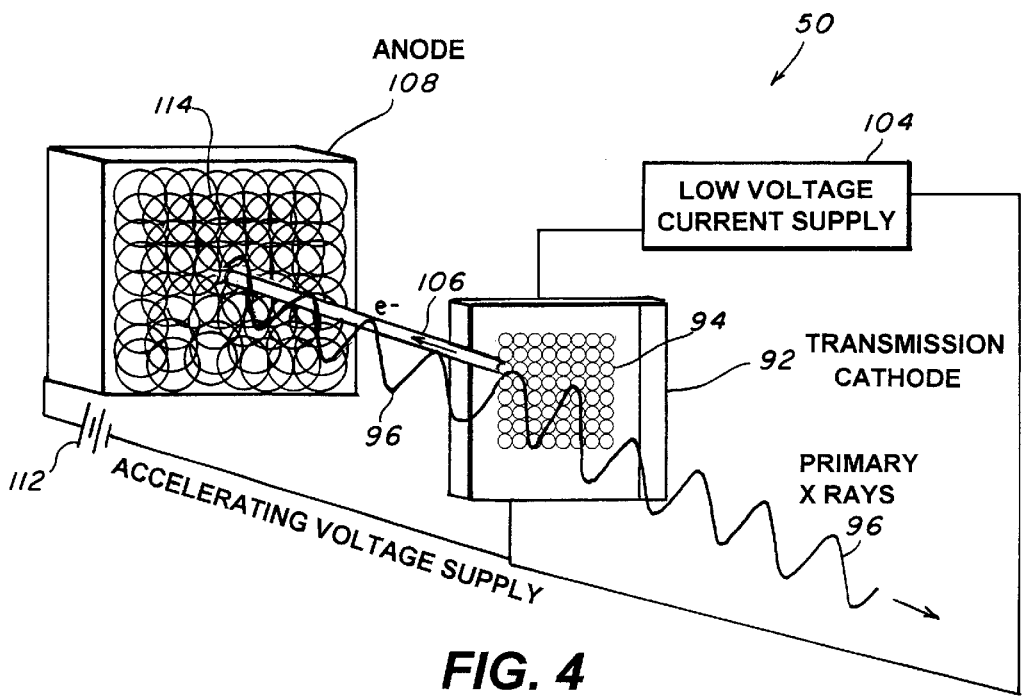
FIG. 4 shows components of a sealed, evacuated X-ray transmission cathode device with an array of cathode electron emitters, current supply, and accelerating voltage.

In further detail of the cathode and anode arrangement of the preferred embodiment of the transmission cathode tube 50 as shown in FIG. 4, an X-ray transmission cathode 92 with electron emitter array 94 is so designed that X rays 96 produced within an evacuated sealed X-ray tube, or pumped tube (not shown), are allowed to exit the tube (not shown) through the cathode 92.

An electrical current generated by a low voltage power supply 104 produces an electron flow 106 from the transmission cathode 92 that propagates to the anode 108 which is impacted by an array of overlapping beamlets at beamlet impact locations 114. As electrons 106 strike the anode 108 X rays 96 are generated that pass through the cathode 92 and exit the tube (not shown).

The electron flow 106 from an individual electron emitter or an array of individual electron emitters 94 on the cathode is accelerated towards the anode 108 by a high voltage from a power supply 112. X rays 96 are generated in all directions from the anode 108. The X rays 96 that strike the walls of the tube (not shown) and are heavily absorbed. The theories of X-ray emission and absorption are well known to those skilled in the art.

The transmission cathode 92 may use a thermionic, field, photo, pyroelectrically stimulated, piezoelectrically stimulated, or plasma emission to generate the electron current within the tube (not shown). In order to qualify as a transmission cathode 50, the X rays 96 need only to be able to exit through the cathode 92 in sufficient quantity to be of use. The transmission cathode 50 may include features covering a part of its area which heavily absorb X rays, so long as the transmission through the remaining cathode 92 area remains sufficient to be useful. Features on or in the cathode 50 may be fabricated of material of any atomic number or combination thereof. The cathode 50 may also include surface coatings, for example to provide a conducting path to drain away surface charge, or dopings, for example to control bulk conductivity.

Unlike the end-window tube, the transmission cathode 50 may be used with a thick anode 108, which improves X-ray 96 production efficiency compared to thin anode X-ray production. The near normal angles of X-ray emission 96 attainable from transmission cathodes 50 offer less absorption than is typically experienced with thick target, side window geometries having the common non-transmission cathode. The transmission cathode 50 may be held at ground potential which simplifies the electronics (not shown) required to supply current and acceleration potentials to the cathode 50. As the transmission cathode 50 is a component of the tube (not shown) externals, it is desirable from a safety standpoint for it to be at ground potential.

Figure 5A:
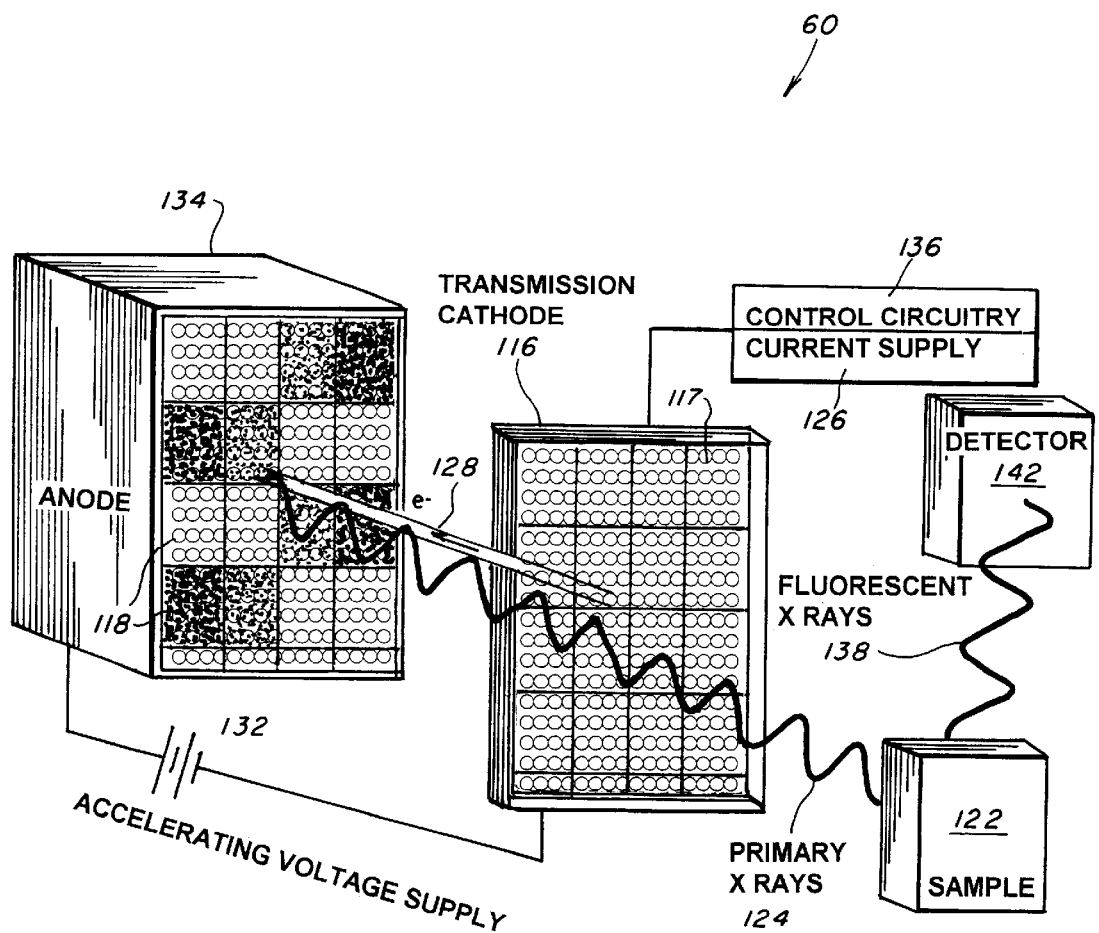
FIG. 5a shows components of an evacuated X-ray transmission cathode device with circuitry to enable the electron source array to be gated and addressed in groups of electron emitters, and with a compositionally structural anode for producing tailored X-ray spectra, with particular application to X-ray fluorescence analysis.

In another preferred embodiment 60, as shown in FIG. 5*a*, for producing tailored, variable X-ray spectra, the transmission cathode 116 in the device 60 is defined in regions of electron sources 117, each of which may be gated ON or OFF. Each cathode region 117 impacts a different respective anode region 118. For convenience in illustration, the regions 117 and 118 are shown as rectangles, although other shapes may also be used. The compositions of the anode regions 118 are variously fabricated to deliver differing X-ray spectra. This device is capable of irradiating a sample 122 with X rays 124 of varying wavelengths.

As the energy of emitted electrons 128 is initially low in thermionic, field emitters and photo emitters, individual electron sources of these types in the emission arrays 118 may be electrostatically gated by using low voltage 126 gating near the electron source; only those sources that are gated on will produce electron beamlets which pass into the region of the tube where the electrons will be accelerated to high voltage and produce x rays. The individual electron sources 117 of the array may be made to be switched ON or OFF, or to emit a variable value of current, as discussed above, in relation to field emitter electron sources. The low extraction voltages 126 allow control by control circuitry 136, and thus enable the electron array source in the transmission cathode 116 to be addressed and scanned; the X-ray emission 125 from the electron target can thus be scanned under control of circuits 136. Methods and techniques of vacuum microelectronics have been published by others for use in electron devices. Here is taught their use for X-ray production and X-ray imaging.

Plasma electron sources are capable of emitting much more energetic electrons, depending on the plasma conditions. Gating of plasma emitters will require gating voltages commensurate with the energy of the emitted electrons. The degree of cathode mass erosion to which plasma sources are susceptible is a disadvantage not shared by the other methods, and limits the practical uses of plasma emission sources.

An areal cathode 116 with multiple areas of gatable electron emission sources 118 and respective anode compositions will be useful for spectrographic applications such as X-ray fluorescence analysis.

A low-voltage power supply 126 applies a voltage to the cathode 116, as described above, generating an electron beam or flow 128 that is accelerated by high voltage 132 to an anode 134. The anode 134 is specifically fabricated with different known compositions at different known locations. The anode 134 is comprised of various known segregated elements 118, such as copper, iron, aluminum, tungsten and molybdenum, or alloys or compositions that, when struck by the electron beam 128, radiate X rays 124 of varying frequencies which propagate to the sample 122 through the cathode 116, as described above. The X-ray spectrum from each location will differ with the composition. The compositional variations may be designed to the micrometer scale or larger. The various areas forming the cathode 118 may be switched ON and OFF by a control circuit 136 to select the desired respective area of the anode 118 that will be struck by the electrons 128 to generate the X-ray wavelength desired. Although a list of elements has been enumerated above, other elements may also be used, this is a teaching that is well known to those skilled in the art. In applications where a single tailored spectrum is desired without variation, the compositionally varied anode 134 may manufactured to provide the desired spectrum when irradiated by emitters 117 that need not be separately gated.

The fields 128 between the cathode 116 and anode 134 determine the size and point of impact of the beamlet, and thus determine the X-ray source location and size attributable to that beamlet. The electron optics are optionally so that adjacent beamlets are essentially contiguous, overlapping, or separate. A single beamlet strikes the anode 134, producing X rays 124 which exit the tube through the transmission cathode 116. This process is repeated in succession, or concurrently, with other beamlets. The location of the X-ray sources for each beamlet is known from the geometry of the components including the cathode 116 and electron optics (not shown). The elemental composition of each successive anode source point 118 is known by design. The total X-ray spectrum is the sum of the spectra from the various source points. The anode 134 may contain multiple points of the same composition The spectral contribution of a particular composition may be enhanced by gating on more points of that composition, or by gating them on for longer periods of time.

The primary X rays 124 emitted by the transmission cathode tube 60 irradiate the sample 122, which fluoresces according to well known physics. The fluorescence X ray 138 is detected by a spectral detector 142 whose output is captured by an analysis system, typical of those known in the art of X-ray spectral detection systems, and spectrally analyzed by computer to determine the chemical elemental composition of the sample. Spectral measurements are performed by the spectral detection system 142. The spectral detection system 142 may be an energy dispersive (ED) detection system or a wavelength dispersive (WD) system. WD apparatus disperses the X rays in space, each wavelength to a different angle, using X-ray diffraction, e.g., from a crystal or multilayer. The detector in a WD apparatus need only count the number of photons arriving, as the wavelength is known from the angle at which the diffractor is tuned.

ED apparatus absorbs individual X-ray photons, converts the photon to an electrical pulse, quantifies the number of electrons in the pulse, and relates the pulse amplitude to photon energy. Photon energy E and photon wavelength W are related by the simple relationship EW=constant, where the value of the constant is well known (12.398 for E in kilo electron volts (keV) and W in Angstroms). Due to the mechanical simplicity of ED systems and their suitability for digital data capture, they are preferred in all but the most demanding work. The spectral measurements made by the detection system 142 are analyzed by a computer (not shown) to determine chemical elemental composition, using methods well known to those skilled in the art.

The function of an XRF system is to irradiate a sample with X rays to stimulate the sample to emit its own fluorescent characteristic X radiation 148. It is advantageous for XRF analysis to be able to vary the primary X-ray spectrum illuminating the sample. At present, this is typically accomplished by irradiating the sample 144 with fluorescent x rays 148, by use of x ray filters 144 or 147, or by replacing the entire X-ray tube with one having a different anode material. A tube with tailored spectrum would obviate the need to rely on the lower intensity of fluorescence or filtered sources, and it would no longer be necessary to replace the tube simply to alter the spectrum.

Figure 5B:
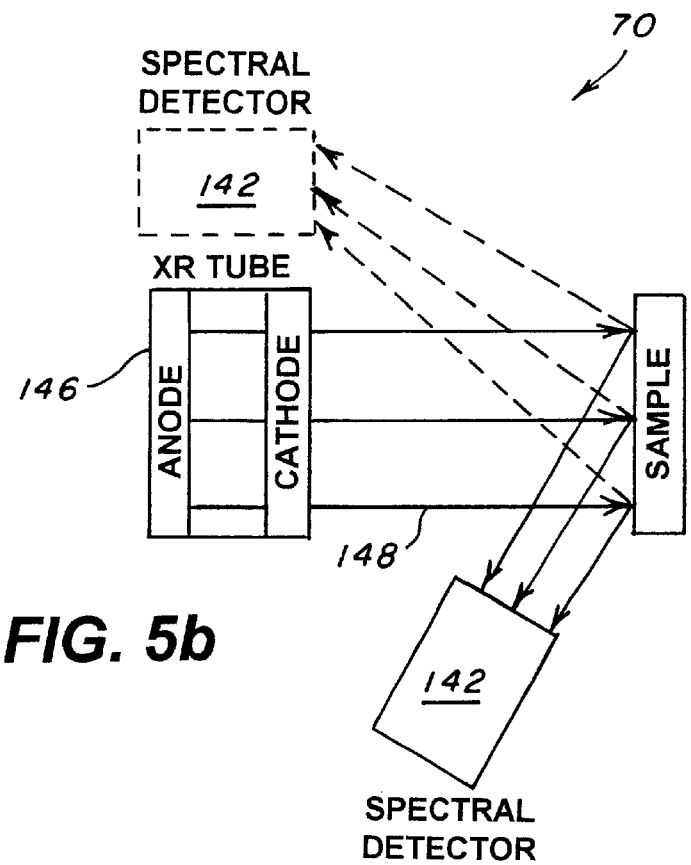
FIG. 5b shows a transmission cathode X-ray tube in use as a source of primary X-rays in an X-ray fluorescence system.
Figure 5C:
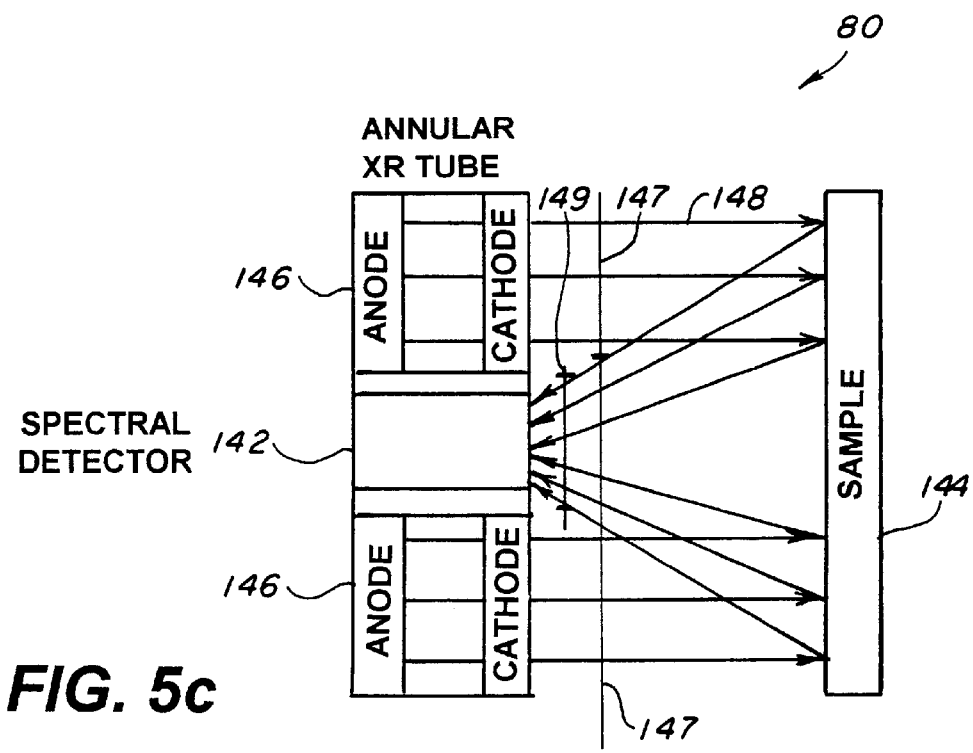
FIG. 5c shows a transmission cathode X-ray tube in use as a source of primary X-rays in an X-ray fluorescence system in which the source and detector are designed for compact configuration. The transmission cathode X-ray tube is made in an annular shape, with the detector located on the axis of the annulus.

In another preferred embodiment, X-ray fluorescence (XRF) systems employing transmission cathode X-ray tubes 70 and 80, as shown in FIGS. 5b and 5c, may differ in the placement of the detector 142. The transmission cathode X-ray tubes 70 and 80 may have single or multiple composition anodes 146. FIGS. 5b and 5c show two typical optional placements of the detector 142; only one detector 142 is necessary in a given system. FIG. 5c shows a side view of an annular areal transmission cathode X-ray tube 80, from the center of which the detector system 142 views the sample 144.

In XRF systems, areal X-ray sources are advantageous because greater X-ray power can be achieved by applying the heat load to a larger area of anode, enabling higher total output X-ray power. XRF systems do not require spatial resolution, so a small source is not required. The areal transmission cathode X-ray tube achieves these advantages.

Figure 6A:
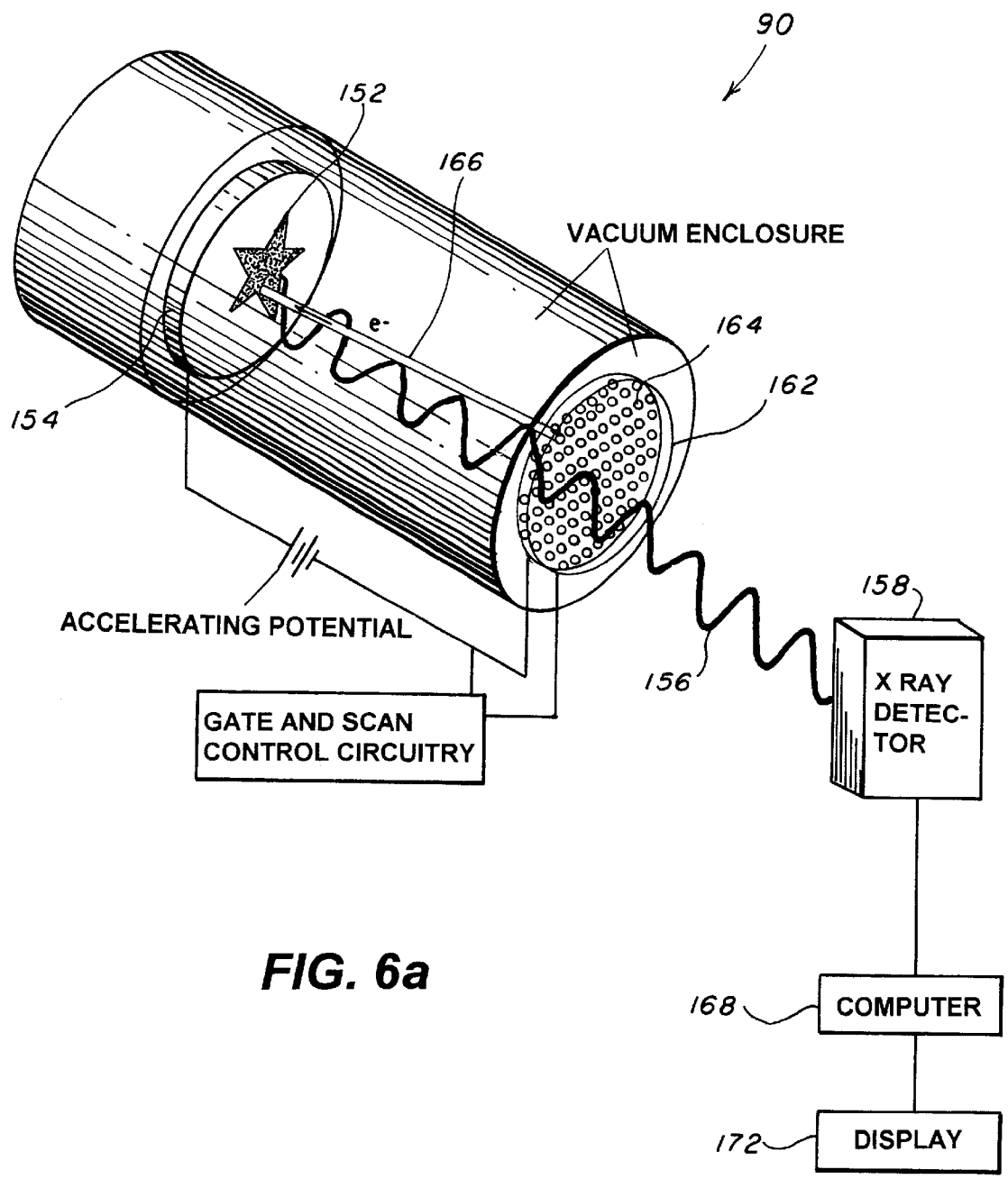
FIG. 6a shows a miniature electron microprobe with a cathode as described in the preferred embodiment with array of gatable electron emission sources that are individually addressable and may be scanned. Operation of the cathode in two-dimensional scanning mode allows a non-imaging X-ray detector system to record the sample spectrum at each illuminated point, and process the data as a two-dimensional scan to record the hyperspectral X-ray image of the sample.

A transmission cathode tube may be configured to operate as an electron microprobe 90, as shown in FIG. 6a. An electron microprobe is a large laboratory instrument similar to a scanning electron microscope (SEM) that scans a beam of energetic electrons onto micrometer areas of a sample to produce characteristic x rays that are detected by a non-imaging spectral detection system. These characteristic X rays are not fluorescent X rays, for fluorescence results from photon (i.e., X ray) excitation not electron excitation. However, the X-ray emission wavelengths are the same in the two cases, so the detection and analysis subsystems may be identical to these used for XRF. Both methods of excitation are useful for the spectral determination of chemical elemental composition. The emitted characteristic X rays may be detected by an ED or WD X-ray detection system and analyzed to determine the chemical composition of the sample, as with fluorescence x rays. Electron probe imaging has become so popular that X-ray detection attachments are commonly found on laboratory SEMs. Contemporary electron microprobes have higher electron beam currents than typical SEMs, and likely also have a larger focal spot on the sample.

A conductive sample 152 that withstands vacuum conditions may be placed in the anode 154 position of a transmission cathode X-ray source 90. X rays 156 emitted by the electron-irradiated sample 152 are detected by an external, non-imaging, spectral detector 158 viewing the sample through the transmission cathode 162. For a system with a gatable and addressable transmission cathode 164, the image of the sample 152 and anode 154 is acquired by scanning the cathode array 162. The compositionally structured anode 134 is now the sample 152 in FIG. 6a, and gating is performed on small groups or individual electron emitters 164 in FIG. 6a rather than on regions or larger areas of emitters 117 as in FIG. 5a. The X-ray detector 158 is located outside the probe 90. Either ED or WD detection or both may be used. (The entire sample 152 may be compositionally analyzed at once but without spatial imaging by activating all electron emitters 164 simultaneously in area illumination.)

A gatable and addressable transmission cathode 162 may be scanned. Successive electron emitters 164 are scanned, each producing an electron impact point on the sample 152 or anode 154, X rays 156 emitted by the electron impact 154 point are recorded digitally in a computer 168 as an image. When a spectrum recording detector is used, the recorded image is an array of spectra known as a hyperspectral image cube. The image cube may be analyzed and displayed as a compositional map of the sample on a computer monitor screen 172; various mappings are possible for a sample containing multiple chemical elements. A single detector 158 may measure many or all X-ray 156 source points in succession. Multiple detectors 158 may view the source points to achieve particular additional advantages. For example, different X-ray filters (not shown) may be applied to the different detectors 158, or different types of detectors 158 with differing response characteristics may be employed as an aid to enhancing the quality or speed of data acquisition.

The imaging granularity of the scanning electron microprobe 90 will be limited by the spacing between emitters in the cathode array 162. While this spacing is larger than the resolution achievable with large, laboratory sized instruments, the simplicity of construction, small size, and suitability for microfabrication offer significant advantages for particular applications which the large and costly laboratory sized instruments cannot meet.

Figure 6B:
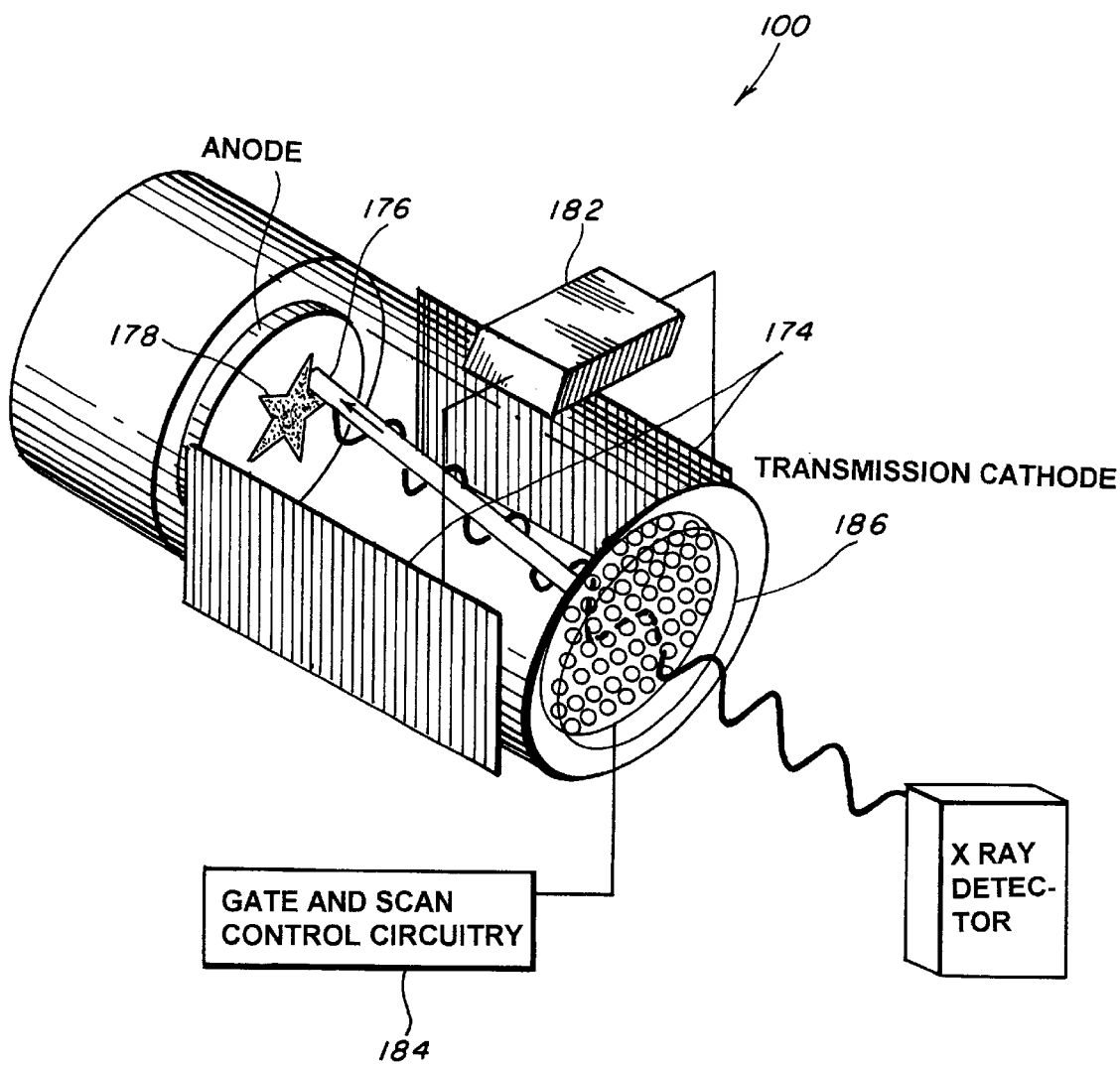
FIG. 6b shows deflection plates used to enhance imaging resolution, provide redundancy, and add control over beamlet impact point.

In another preferred embodiment, as shown in FIG. 6b, the image granularity of the scanning electron microprobe 100 may be reduced by the addition of elements, such as electrostatic deflection plates 174, to control the scan of the electron beamlet 176 over distances less than the spacing interval. An electron beamlet 176 may then be placed controllably on intermediate points on the sample 178, between the home impact areas that adjacent beamlets 176 would impact if no deflection were applied. For example, electrostatic deflection plates 174 may be used to scan a deflected beamlet 176 onto the home impact area that its neighbor beamlet would impact if no deflection were applied. Deflection plates 174 may be placed so as to deflect all beams that may be transiting the tube 100. By varying the deflection voltages 182, the deflected beamlet 176 can be made to strike its own home impact area, that of its neighbor, or any intermediate point, whereby finer positioning than the source spacing is achieved. In addition, redundancy is achieved, whereby the same area of sample 178 may be addressed by neighboring beamlets in succession by use of deflection circuitry applied to the deflection plates 174 and gate and scan control circuitry 184 applied to the transmission cathode 186.

Figure 6C:
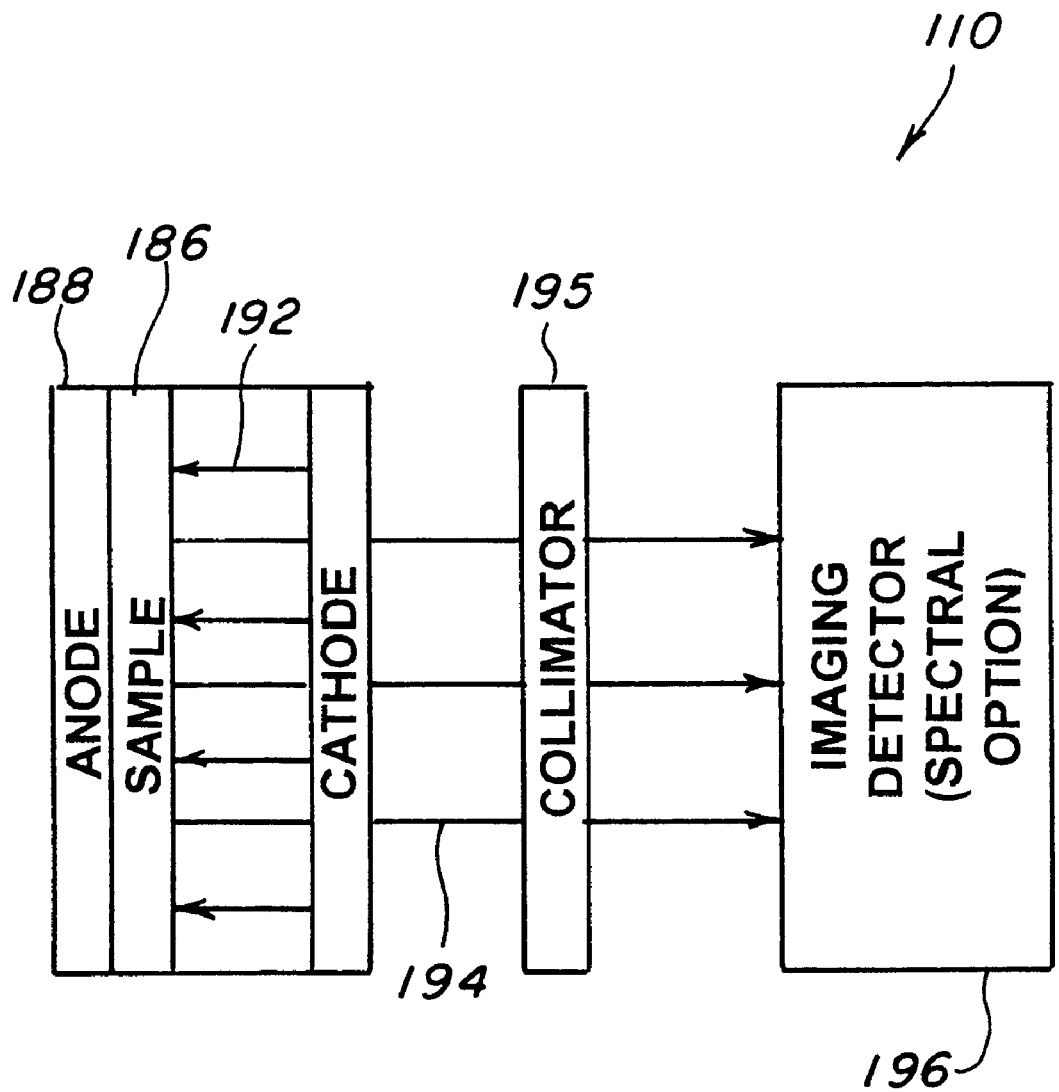
FIG. 6c shows an imaging electron probe emission analysis system in which the sample is placed at the anode position of a transmission cathode X-ray tube, with image formed by an imaging X-ray optic such as a collimator, and detection of the X rays emitted by the sample being performed by an external imaging detector viewing the sample through the transmission cathode. The imaging detector records an image of the X-ray emission from the sample. Use of a spectral imaging detector allows the recording of the hyperspectral X-ray image of the sample.

In another preferred embodiment, as shown in FIG. 6c, multiple source points of a collimator imaging probe system 110 may be activated simultaneously. The sample 186, in the anode 188 position, is again illuminated directly by electrons 192 to generate characteristic X rays 194 from the sample 186. The collimator 195 preserves the X-ray emission image of the sample 186 onto an imaging detector 196. A spectral imaging detector may also be used to collect a hyperspectral image cube.

Figure 6D:
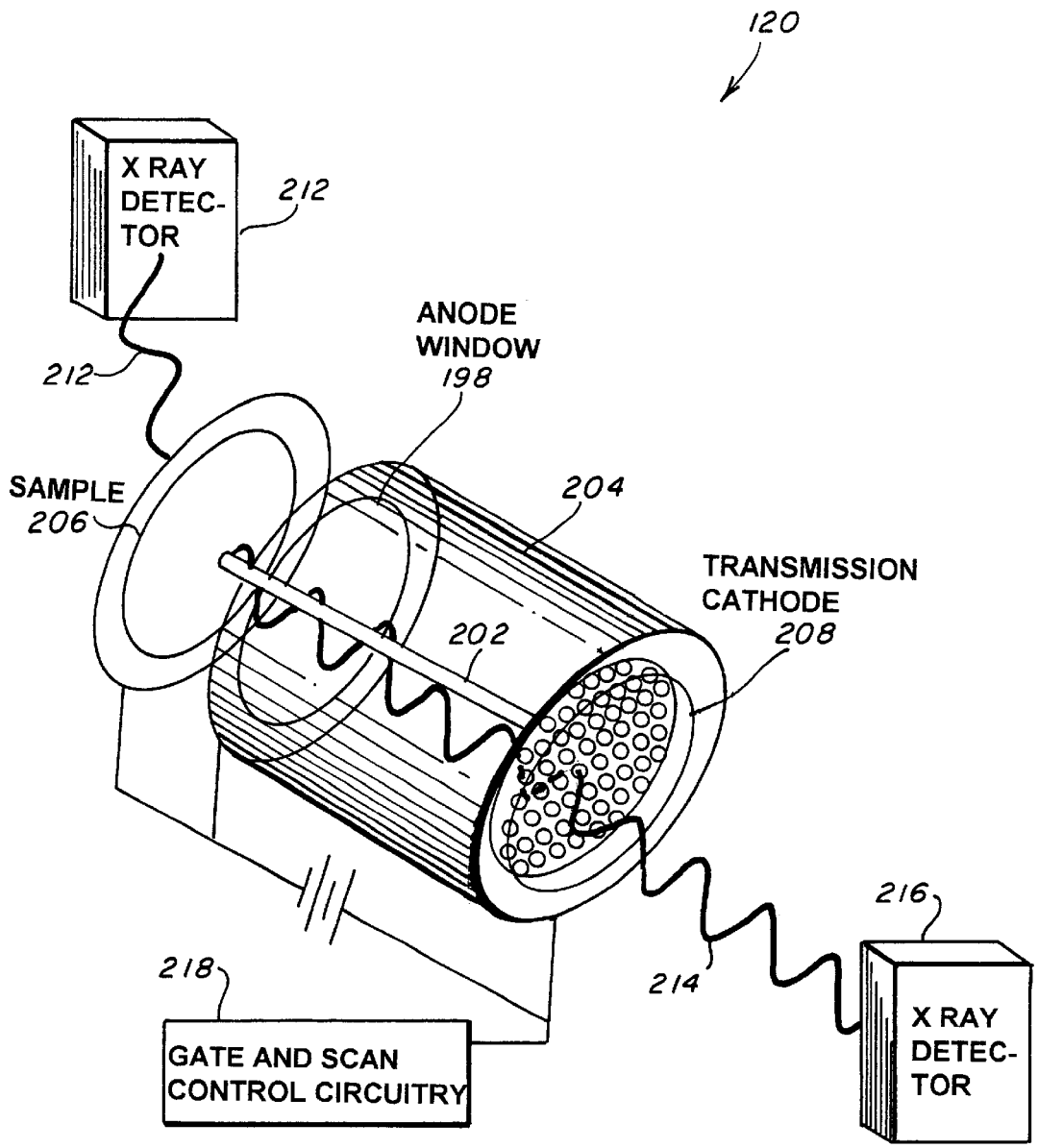
FIG. 6d shows an electron probe emission analysis system with an anode-window, through which electrons from the transmission cathode are accelerated to impact a sample located outside the sealed tube. X-rays emitted by the sample are transmitted by the anode-window and by the transmission cathode and detected by an X-ray detector. Scanning the transmission cathode enables compositional imaging of the sample. X-ray emission may be detected from the front of any sample, or through samples that are sufficiently thin to transmit their own emitted X-rays.

In another preferred embodiment, as shown in FIG. 6d, having a scanning transmission cathode with anode-window electron probe 120, where an anode 198 is fabricated having sufficiently thin regions, or fabricated of a sufficiently thin material such as thin beryllium metal foil, the electrons 202 may be accelerated from the cathode through the anode 198 and into an external volume containing a sample 206. The transmission cathode 208 and electron optics (not shown) may then be completely sealed and maintained clean of possible outside contaminants. The sample 206 is placed close to the anode-window 198. The volume holding the sample 206 may be evacuated to facilitate electron 202 transit to the sample 206, while retaining the benefits of a sealed source tube 204. Alternatively the volume holding the sample 206 may be filled with a low density or low atomic number gas. The transmission cathode 208 may be scanned or activated on an areal basis using a gate and scan control circuitry 218, as in the previous examples. X rays 214 emitted by the sample 206 are transmitted through the sample 206 holding volume, through the anode-window 198, through the transmission cathode 208, and detected by a first detector 216. Also X rays 212 emitted by a sufficiently thin sample are transmitted to a second detector 222. Scanning the transmission cathode 208 can be used to image the composition of the sample 206, as before, using a first detector 216 or a second detector 232.

Figure 7:
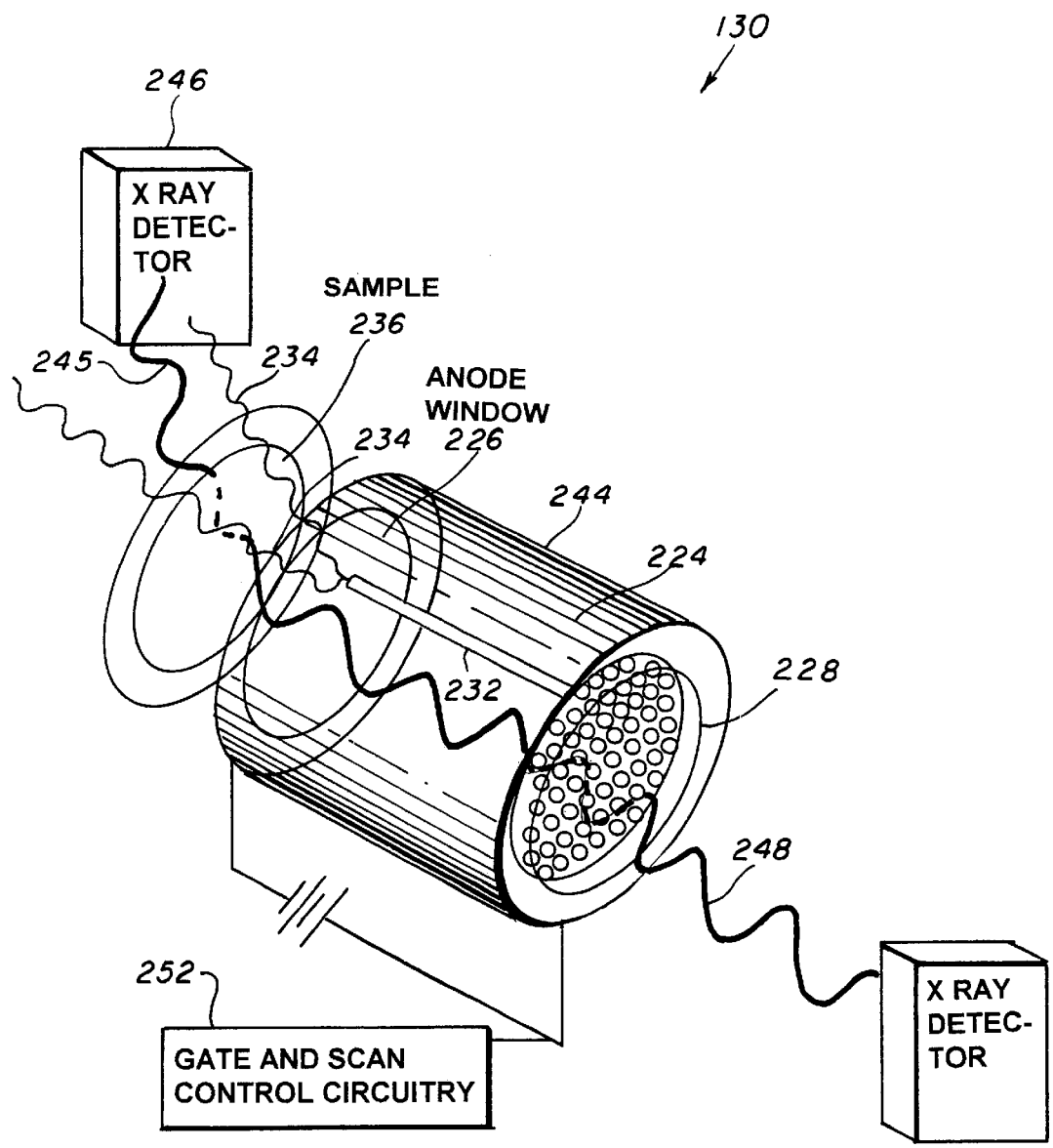
FIG. 7 shows an X-ray probe emission analysis system, in which an anode-window of a scanning cathode tube is the source of primary X rays that may be used to radiograph or raster image a sample placed in close proximity. Alternatively, fluorescence emission from the sample may be used to image the sample.

In another preferred embodiment, an X-ray probe tube 130, as shown in FIG. 7, is outfitted with an anode-window 226 of higher atomic number (Z) and greater mass thickness, an X-ray probe may be produced. The probe 130, includes a scanning transmission cathode 228 and the higher Z anode-window 226 in an evacuated, sealed or pumped tube 244. As the electron beamlets 232 scan across the anode-window 226, the anode-window 226 emits primary X-rays 234 from successive impact points. The scanning is controlled by the use of gate and scan control circuitry 252. The scanned anode-window 226 becomes a scanned X-ray source.

A sample 236 placed in close proximity to the anode-window 226 may also emit characteristic fluorescent radiation in all directions and may be viewed by variously placed X-ray detectors. Fluorescent X rays 248 from the sample 236 that transit through the anode-window 226 and through the transmission cathode 228 may be detected by a first detector 238. Fluorescent X-ray emissions 245 from the sample 236 may be viewed in transmission through the sample by a second X-ray detector 246 in the Sample Transmission position. More highly absorbing portions of the sample 236 will present weaker transmitted fluorescent X-ray signals 245 to the second detector 246. Alternatively, an areal imaging detector (not shown) may likewise be placed in close proximity to the sample 236 to receive and, by collimator or contact radiography, record the X-rays 245 transmitted through the sample 236 to the areal imaging detector.

Both detectors 238 and 246 will also view the anode-window 226 source. Much of the intensity of unwanted X rays 242 from the anode-window 226 source may be reduced for the Sample Transmission detector 246 by moving the detector 246 off axis, as shown, and interposing a suitably fine collimator (not shown) between the anode-window 226 and the sample 236.

In an arrangement not shown, the transmission cathode X-ray source may be used in point projection radiographic imaging systems. For radiographic systems, a small X-ray source (not shown) is often preferred to the use of collimation. The usual requirements on X-ray source size and placement apply. The compactness of the transmission cathode X-ray source (not shown) may offer significant advantages. To meet this need for a point source, the areal cathode's 274 electron current can be focused to a small area on the anode 276, using additional whole-beam focusing elements (not shown) to shape the fields within the tube (not shown), as is well known to those skilled in the art of electron focusing. The limitations on X-ray power delivered by point source X-ray tubes (not shown) are set by the temperature at which the anode 276 metal vaporizes or melts. The lifetime of the common filament tube is often determined by the lifetime of the filament. The areal transmission cathode 274, with convergent electron beam geometry to produce a point focus, offers redundancy in the electron source, extended cathode 274 life and thus greater tube life.

Figure 8A:
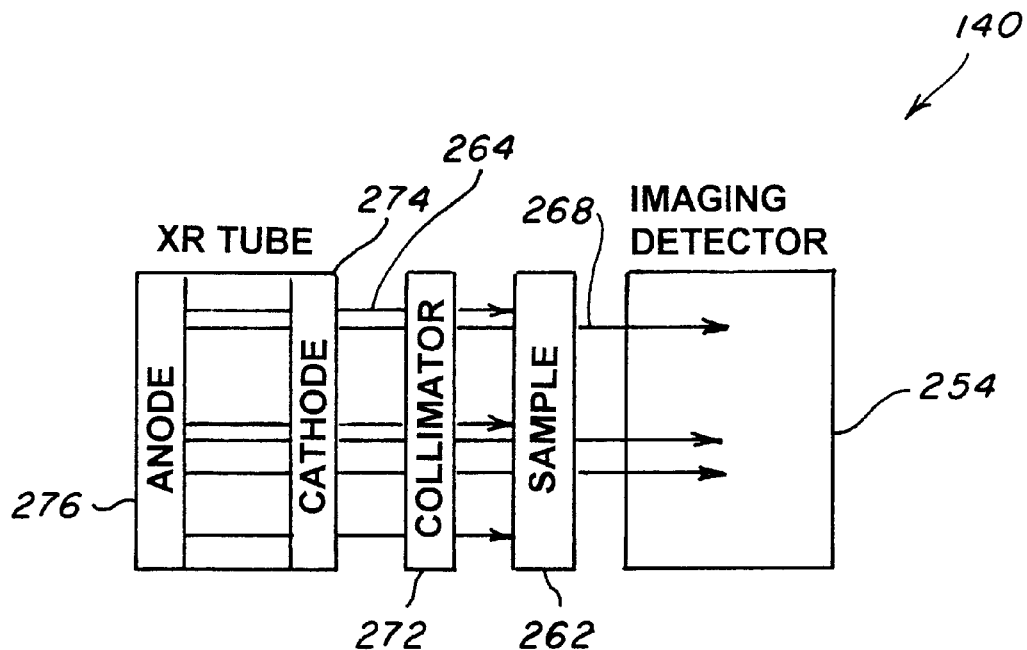
FIG. 8a shows a compact collimator X-radiography system with a large area, transmission cathode X-ray source. The collimator is disposed between the source and the sample, thus reducing the amount of x rays irradiating the sample.
Figure 8B:
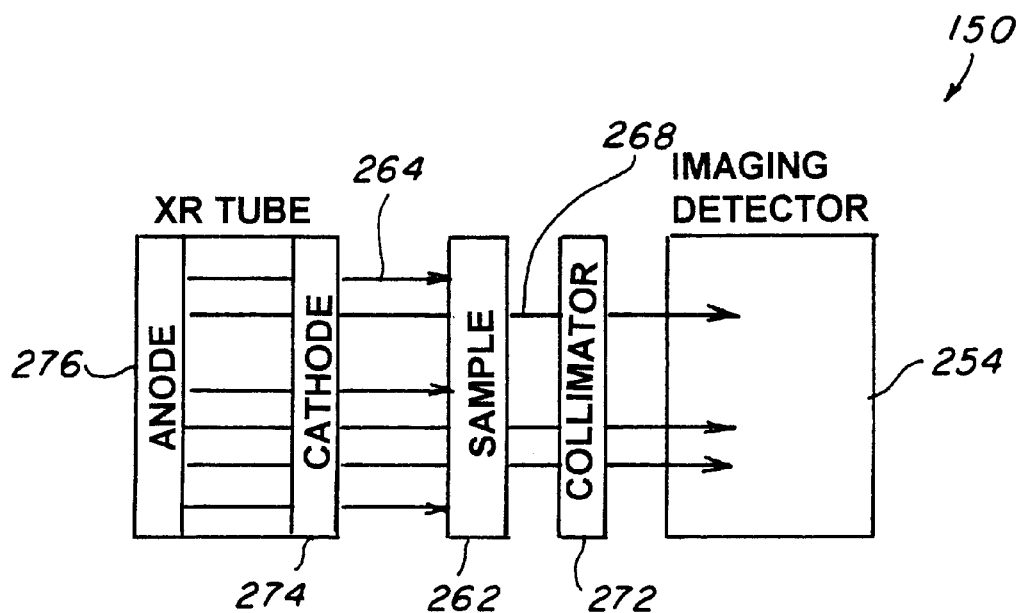
FIG. 8b shows a compact collimator X-radiography system with a large area, transmission cathode X-ray source. The collimator is disposed between the sample and the imaging detector.

In another preferred embodiment, as shown in FIGS. 8a and 8b, an areal transmission cathode X-ray tube 140 and 150, respectively, used for X-radiography, performs the function of graphically imaging a sample with X-ray illumination, e.g., a chest X-radiograph. Because an image is formed, an imaging detection system 254 is required. Areal X-ray sources are infrequently used in radiographic imaging systems. Areal sources require collimation to refine the image resolution. An X-ray collimator 272 is analogous to venetian blinds, allowing view for some angles but not for others. X-ray collimators 272 are made in various geometries. Soller slits are a stack of planar absorbing sheets separated by open spaces through which X-ray transmission is permitted. Tube collimators 272 are a stack of tubes; X rays pass through the centers of the tubes and in the open spaces between tubes. Square cylindrical tubes are also used for X-ray collimation, as are hexagonal structures. The basic concept with collimators 272 is to make the acceptance angle of the collimator 272 sufficiently small that the image is resolved, but as large as permitted so as to retain as much X-ray flux 268 as possible.

Three key features of collimators 272 for X-ray imaging are (1) collimators 272 function by absorbing X rays 268, (2) collimators 272 require areal sources to be effective for imaging, and (3) collimator 272 imaging arrangements can be very compact. X-ray sources of large enough size to be of interest for compact collimator 272 imaging have not generally been available. X rays 268 absorbed by the collimator 272 are of no value, and the power used in producing them becomes lost power. Here, the salient parameter is local source brightness more than total output power. For these reasons, collimators 272 are rarely used for imaging.

The transmission cathode 274 makes large area X-ray sources a possibility, and therefore makes compact collimated X-radiography a possibility. Losses due to X-ray 268 absorption in the collimator 272 remain an issue, as does the brightness of individual source elements. A collimator X-ray imaging system 150 and 160 with an areal transmission cathode source 274 can achieve constant incident intensity across a large sample 262 to be imaged in a compact arrangement.

The collimator 272 for the X-ray source may be located in any of several possible locations. FIG. 8a shows the collimator 272 between the transmission cathode tube 274 and the sample 262. In FIG. 8b, the collimator 272 is shown between the sample 262 and the imaging detector 254 The collimator 272 may also be included within the X-ray tube (not shown).

Figure 9A:
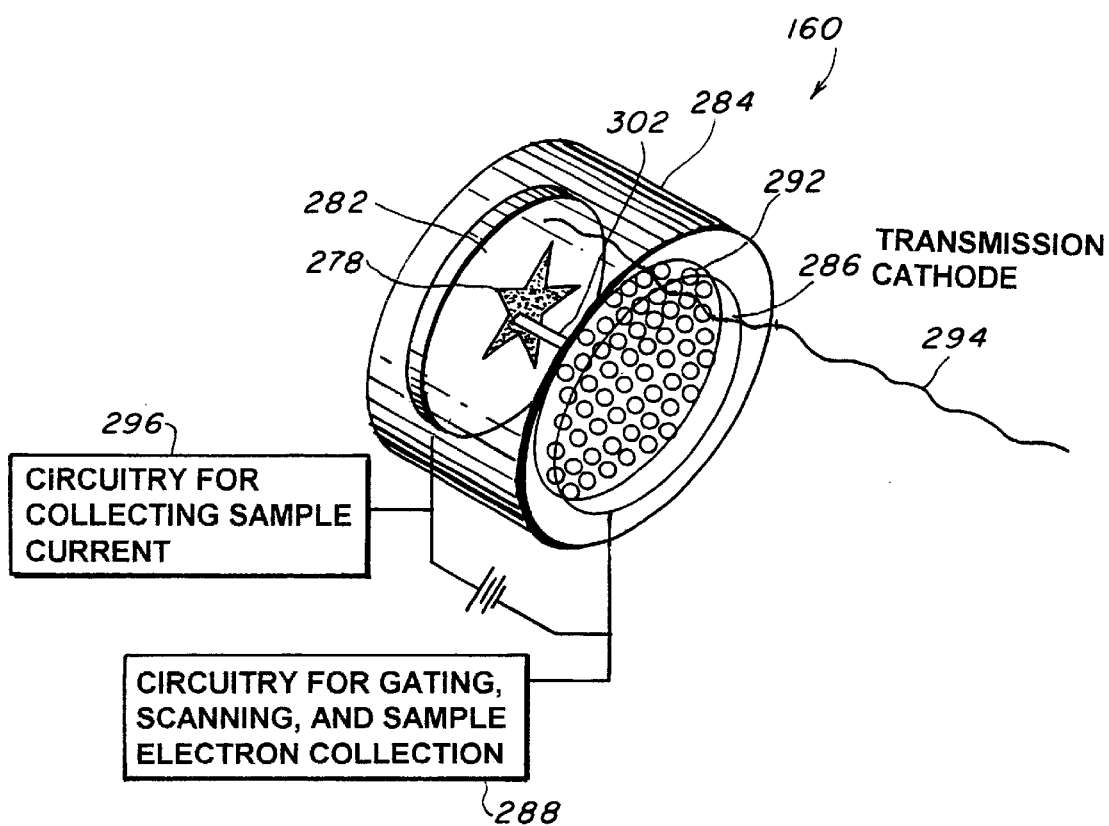
FIG. 9a shows a miniature scanning electron imaging system in which the sample is placed at the anode position of a tube having an addressable cathode array of gatable electron emitters. As each emitter is addressed in turn, scattered and other electrons originating from the sample or anode are collected by the unaddressed gate electrodes and recorded to form an image of the sample and anode. Alternatively, the sample current may be collected and imaged in a similar fashion. Two-dimensional scanning is accomplished by addressing the cathode, and collimation is provided to the beamlets by electrodes on the cathode.

In another preferred embodiment, as shown in FIG. 9a, a scanning electron imaging system 160 in which the sample 278 is placed at the anode 282 position of an evacuated tube 284 has an addressable cathode array 286 of gatable electron emitters 292. Control of the gating of the gatable electron emitters 292 is provided by the use of circuitry for gating and scanning, according to techniques that are well known to those skilled in the art. The electrons 302 emitted by the cathode 286 are primarily electrons. As each emitter 292 is addressed in turn, scattered and other emitted electrons 294 emanating from the sample 278 or anode 282 are collected by electrodes within the tube 284 utilizing circuitry for collecting sample 278 scattering and emission current within the tube 284, for example the unaddressed gate electrodes 286, and recorded to form an image of the sample 278 and anode 282. Regions of the sample 278 that cause many electrons 302 to be collected will appear differently in the image than regions that cause few electrons 302 to be collected. Compositional as well as topographic variations are known to influence electron scattering and emission by the sample 278. Additional or alternate electron 302 collection means may be implemented. Alternatively, the sample current may be collected and imaged in a similar fashion. Sample current is that part of the primary electron current 246 that is collected by the sample 278 or anode 284. The accelerating voltage of the emitted cathode electron beamlets 302 may be greater than or less than the voltages required for an X-ray emitting tube. For lower accelerating voltages, the sample 278 may optionally be placed closer to the cathode array 286. The X-ray transmission properties of the cathode 286 are not of concern for the operation of this tube as an electron imaging system. This system requires no magnetic lenses for focusing and no deflection electrodes to accomplish raster scanning. Raster scanning is accomplished by addressing the cathode, and collimation is provided to the beamlets 302 by the gate electrodes 292 or other electrode structures as is well known to those skilled in the art. An electron imaging system 160 is thereby achieved in a device with simplicity of design, manufacture, and use.

Figure 9B:
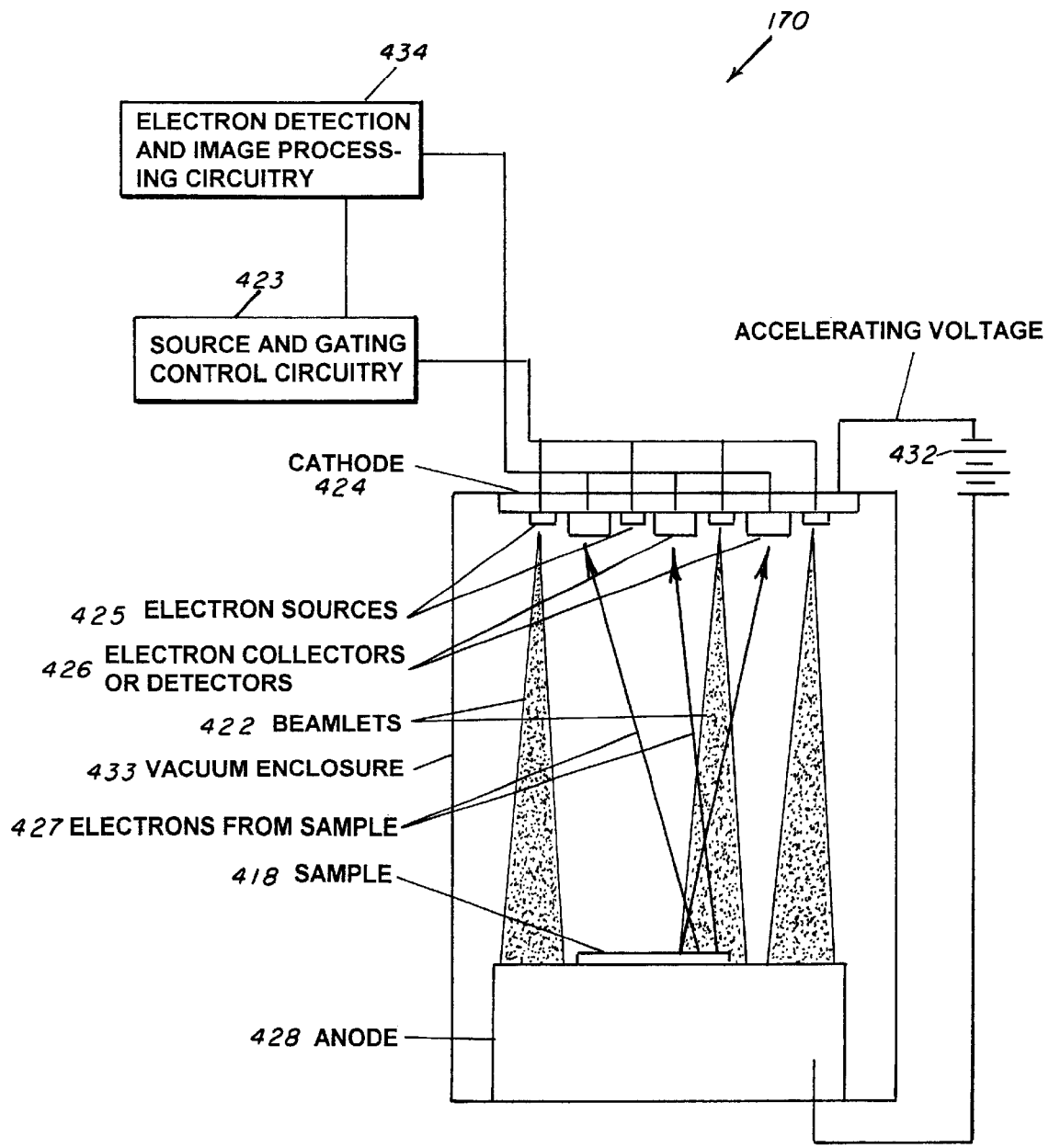
FIG. 9b shows a cross section of a miniature scanning electron imager.

In FIG. 9b, a cross section of a miniature scanning electron imager 170 is depicted in which additional elements are added for the purpose of enabling or improving the detection of electrons 442 from the sample 418. The cathode 424 may be either absorbant or transmissive to x rays. The gatable electron sources 425 may be any of various varieties of electron sources, including field emitters, photoemitters, thermoemitters, or other types of electron emitters. Individual emitters or groups of emitters are gated sequentially. For purposes of illustration, multiple beamlets 422 of electrons are emitted by the electron emitter 425 under control of electron source gating and control circuitry 423. The beamlet 427 electrons are accelerated toward the anode 428 and a sample 418 by high voltage 432 in an evacuated enclosure 432. The beamlets 427 impact a sample 418 or the anode 428 to produce secondary electrons emanating from the sample or anode, and some of the incident electrons in the beamlet 422 are backscattered 420 by the sample or anode. Some of the secondary electrons and back scattered electrons are collected or detected by electron detectors 426. The signals from electron detectors 426 are received and processed by electron detector circuitry 434 to form an electron image of the sample 418. The electron detectors 426 may be any of various varieties of electron detectors well known to those skilled in the art.

Figure 10:
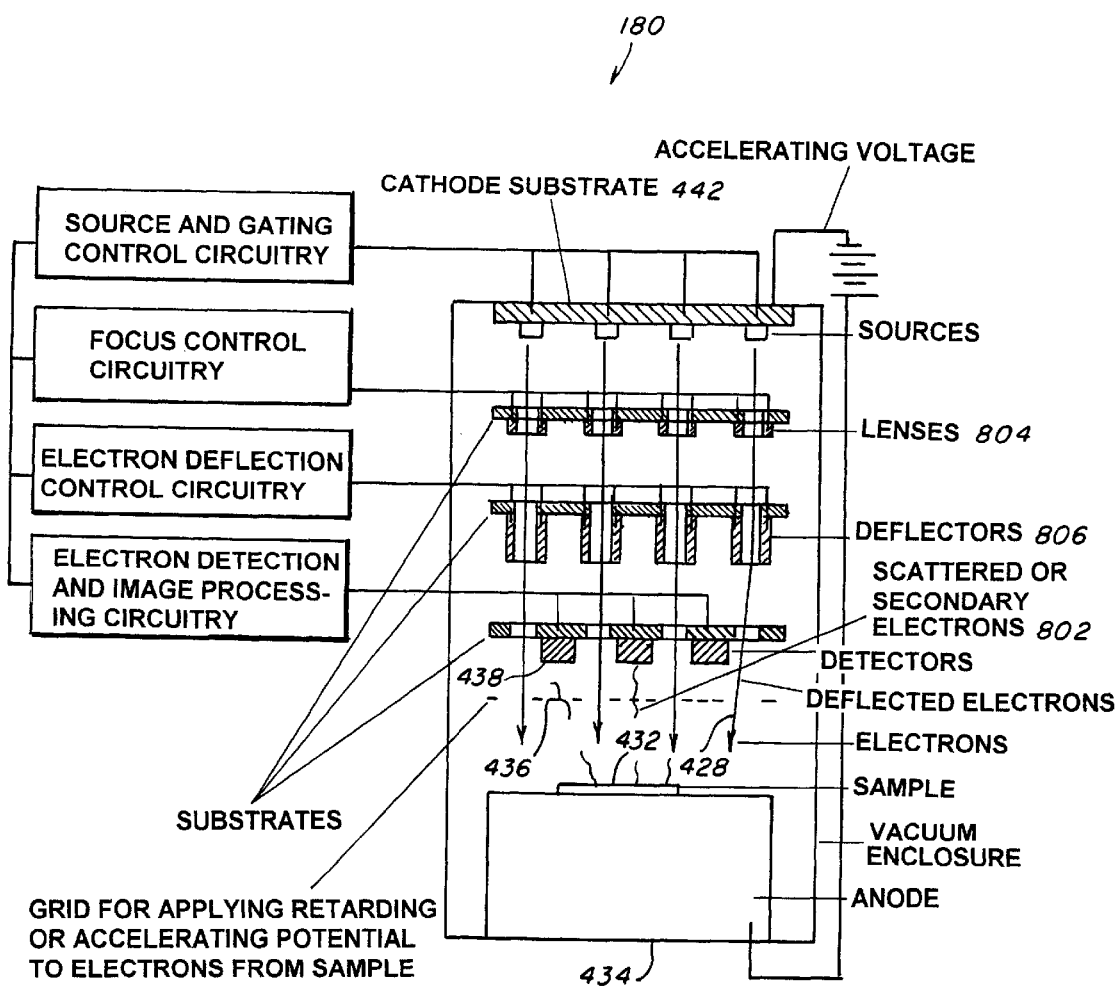
FIG. 10 shows a cross section of a miniature scanning electron imager with optional elements for controlling beam profile or beam deflection, or for retarding electrons emitted by sample or anode.

Additional elements may be added, singly or in combination, to provide improved electron detection or improved electron beam handling or both, such as in a miniature scanning electron imager 180, as illustrated in FIG. 10. Devices for electron collection and detection may be added as shown, whether on existing substrates or on new substrates or holders, and placed in a manner not to impede the primary electrons or beamlets 428 but to collect the electrons 802 back scattered or secondary electrons emanating from the sample 432 or anode 434. These devices for electron collection and detection may rely on scintillation, or direct charge collection performed by devices such as silicon devices or Faraday cups or conducting electrodes, or may rely on electron amplification performed by devices 438 such as electron multipliers, channel electron multipliers, microchannelplates, and the like. The electron collection and detection devices 438 are connected to electronics for processing the detected signal. The electron collection and detection devices 438 may have the facility to accelerate or decelerate electrons 436 from the sample 432, by application of suitable voltages to the devices themselves or to electrodes or screen grids 436 or the like placed between the devices438 and the sample 432. Additional elements 804 may be optionally added for controlling the beamlet 428 beam profile, such as ring shaped electrodes, hollow cylindrical conducting electrodes, or other elements of shapes well known to those skilled in the art of electron optics to be effective for controlling beam 428 profile by means of electric fields, or such as magnet coils or magnets for controlling beam profile by means of magnetic fields. Further elements 806 for controlling the deflection of individual or multiple beamlets 428, with associated deflection electrical control circuitry, may be optionally added as illustrated in FIG. 10. Provided the cathode 442 of the imager 180 of FIG. 10 is a transmission cathode, the imager 180 may further be used as an electron microprobe when outfitted with X-ray detection.

It is to be understood that elements for controlling beam profile or beam deflecting or electron collectors or electron detectors, described here with reference to a scanning electron imager, may optionally be incorporated into an electron probe image analysis system 90, as in FIG. 6a or an X-ray probe emission analysis system 130, as in FIG. 7.

Figure 11:
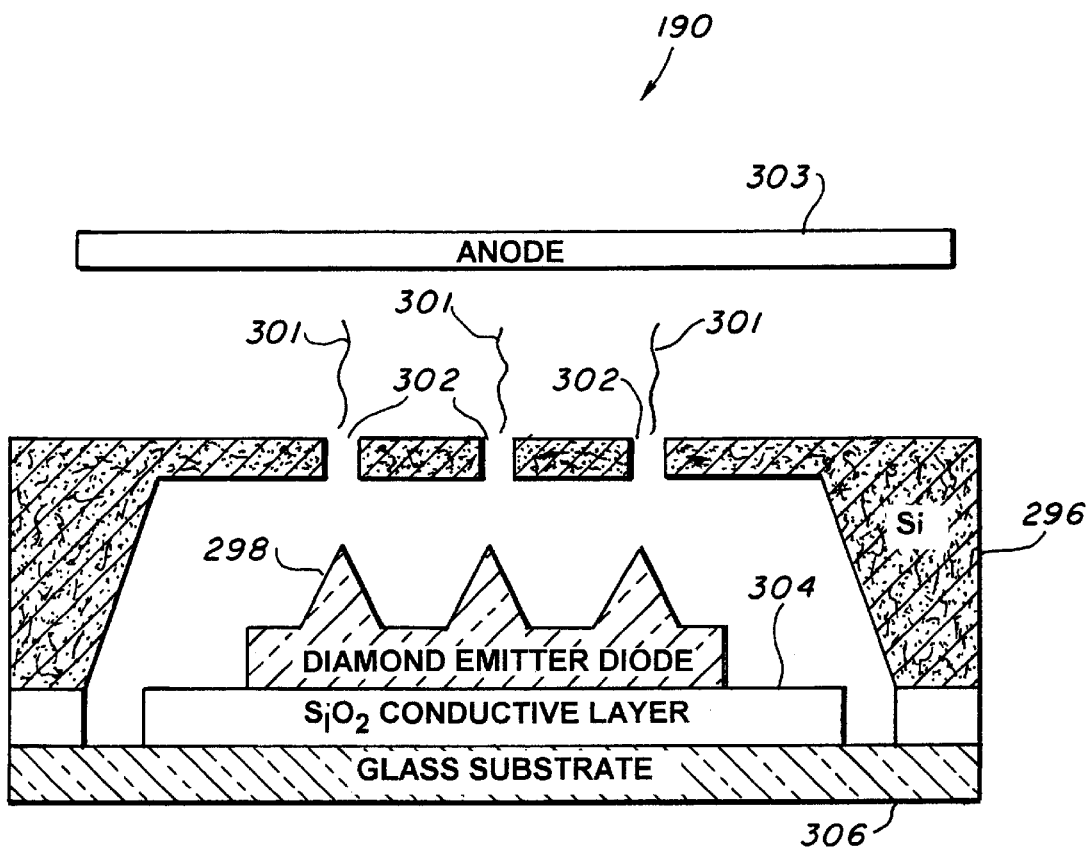
FIG. 11 shows a variant construction for a diamond field emitter.

In a preferred embodiment of the variant transmission cathode, a different diamond electron field emitter 190 may be employed as a transmission cathode, as shown in FIG. 11. See, Normile, FIELD EMITTERS FINDING HOME IN ELECTRONICS, Science, Vol. 281, pp. 632–633, Jul. 31, 1998 and Kang et al., ULTRALOW BORON-DOPED DIAMOND FIELD EMITTER VACUUM DIODE, Elect. Dev. Ltrs., Vol. 19, No. 10, pg. 379, October 1998. A cover device 296 of silicon, on layer of silicon oxide 304 which has been deposited on a glass substrate 306, encompasses a diamond emitter diode 298 and over each diode 298 is an opening 302 to allow passage of electrons 301 to the anode 303. In other designs, metal gate electrodes are used as positive electrode for field extraction and collimation of the electron beam. Other types of field emitters, not involving diamond, may also be used in transmission cathodes.

The ability to make micro-heaters has been amply demonstrated in the microelectronic mechanical systems (MEMS) teachings. Arrays of such micro-heaters can be used as thermionic electron sources, with total areas much larger than the area of a typical drawn filament. Micro-heater thermionic electron sources may be switched by controlling the heater currents for each source. Electrostatic switching of the emitted electrons remains as an available switching option which may be implemented. Two emission controls are them available: heater current and gate potential. Electron emitters based on thermionic emission may be used as electron emitters in transmission cathodes, or in electron imaging, as taught herein, A hybrid approach could use field emission aided by moderately elevated temperature, i.e., significantly lower temperature than those at which drawn wire filaments are typically operated, yet above the ambient. This hybrid approach removes some of the disadvantages of high temperature. As above, two parameters are available for controlling beamlet current, namely emitter potential and emitter temperature.

A photoemitting cathode may be used, which includes a suitable substrate holding a photomissive material on its surface inside the X-ray tube. The substrate may be monolithic. A light source is arranged to illuminate the photoemitter with sufficiently energetic photons as to stimulate electron emission. As X rays are themselves sufficiently energetic photons as to stimulate photoemission, even from metallic surfaces, the emitted X rays will aid in the continued operation of the device, provided they impinge on photoemitting material. By using a microchannel plate electron multiplier in conjunction with the photocathode, the X rays absorbed by the cathode (or microchannel plate) can stimulate electron emission which will supply the anode with sufficient emitted electrons to maintain a self-sustaining X-ray intensity on the cathode. The emission may be ceased by removing the high voltage or restricting the cathode current, thus preventing the electrons from reaching X-ray emitting energies. Electron emitters based on photoemission may be used as electron emitters in transmission cathodes, or for electron imaging, as taught above.

In a micro-photoemitter array design in which the photoemissive material is patterned on the cathode in an array geometry, the array elements may be selected and gated on by virtue of their being illuminated by photons. Alternatively, the emitted electrons from photoemitters may be electrically gated as with other methods of emission. In yet another alternate, each array element may incorporate a photoswitch which, upon illumination, causes a gate voltage to be applied to the respective electron emitter, which then emits. Selection or scanning of individual elements or areas can be performed by illuminating or masking of photoswitches that apply gate voltages.

Other elements, including metal conducting layers, doping layers, and other electron emitter designs may be used in variant electron emission designs. For transmission cathodes, the resulting structure must meet the criterion of being transmissive to X rays. The various electron emitters disclosed for transmission cathodes may also be applied for electron imagers and X-ray probes.

The use of areal electron emission from an array of electron emitters reduces the current requirements on each electron source. The current requirements are closely linked to longevity and reliability; thus, the disclosed cathodes offer the potential for increases in both.

A recent technology for electron emission is offered by microfabricated devices. Small cross section microstructures including electron emitters can be fabricated directly on or spanning small gaps on various substrates, such as silicon or others. Microfabrication can be carried out with virtually any class of material, including metal conductors, insulators, or semiconductors. Each micro electron source produces a beamlet of electrons. Microsources can be arranged in arrays or formed in patterns of any suitable shape.

Figure 12:
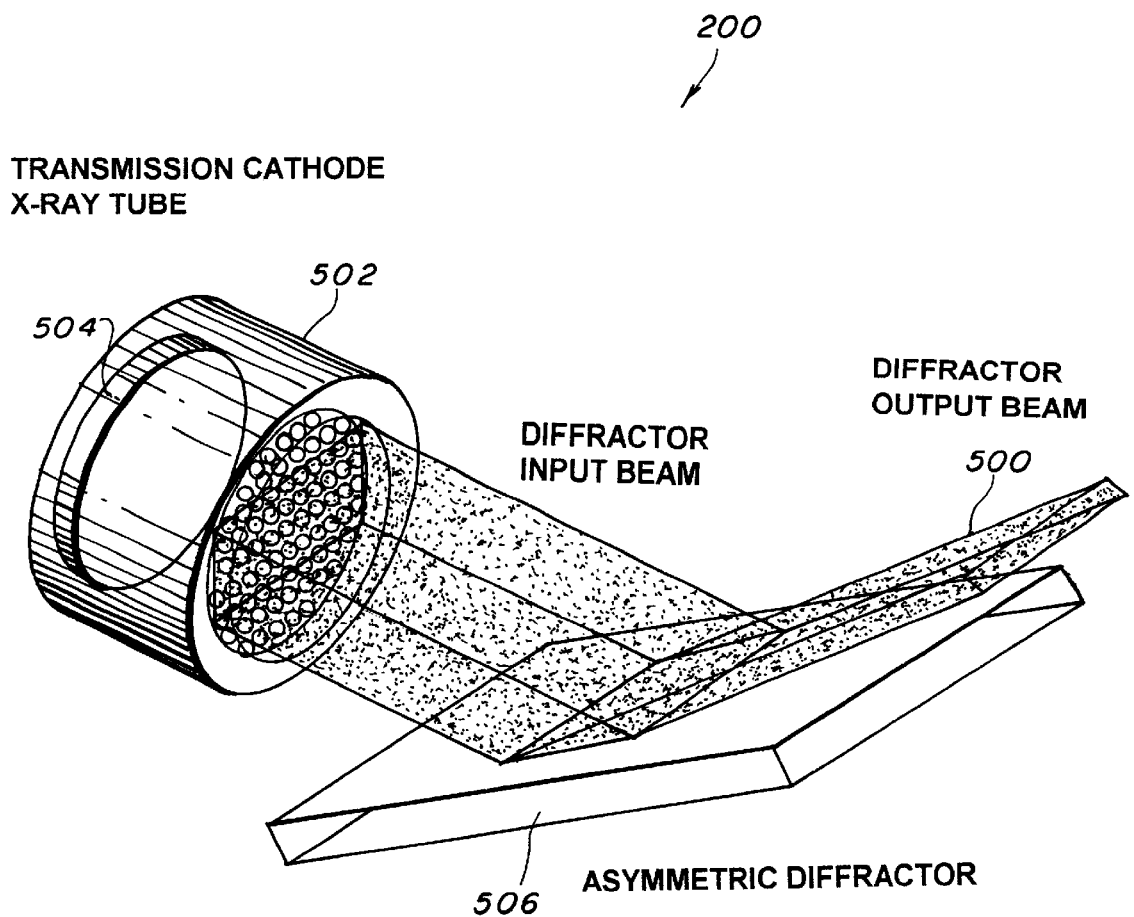
FIG. 12 shows a transmission cathode X-ray tube, monochromatic X rays from which are emitted in a beam of altered cross section by means of an asymmetrically diffracting X-ray optical element.

X-ray diffraction applications typically make use of only small angular segments of the x rays emitted by X-ray tubes. This is a natural consequence of the small range of incident and reflected angles (typically much less than a degree of arc) over which the conditions are satisfied for X-ray diffraction by optics such as crystals. This, combined with the relatively small source size of X-ray tubes, leads to the restriction that diffracted X-ray beams are low power and small. The small size of diffracted beams has been addressed by Boettinger, et al., who taught a method of using asymmetric diffraction to expand the cross section of a diffracted beam to sizeable and useful extent, with an associated lowering of the power per unit area of the beam. (SEE W. J. Boettinger et al., X-RAY MAGNIFICATION, Rev. Sci. Instrum., Vol 50, No. 1, pp. 26–30, 1979). Alternately, the Boettinger technique can be used in reverse to reduce the cross section but increase the power per unit area of the beam. One crystal is required for each dimension in which an X-ray beam size alteration is to be carried out. Any diffractor from which asymmetric diffraction may be produced can be used in a Boettinger arrangement. In another preferred embodiment, as shown in FIG. 12, 200 the areal transmission cathode tube 502 offers a means for producing X rays from a large area. The total power emitted from an areal transmission cathode tube 502 can exceed the power available from a standard X-ray tube, without overheating the anode 504. This larger source may then be diffracted by a crystal or other diffracting optic 506 to irradiate larger areas with greater X-ray power than previously available. By application of the Boettinger technique in reverse, as depicted in FIG. 12, the diffracted rays 508 from a large area transmission cathode tube may be reduced in cross section and increased in power density to values previously not readily available in the laboratory. By application of the forward Boettinger technique with an areal transmission photocathode X-ray tube, exceptionally large beams of monochromatic radiation may be produced.

Although the invention has been described in relation to the exemplary embodiment thereof, it will be understood by those skilled in the art that other variations and modifications such as, any X-ray system may be used with X-ray filters to advantageously treat the X-ray spectrum to modify its properties in ways well known to those skilled in the art, can be affected in the preferred embodiment without detracting from the scope and spirit of the invention as set forth in the claims.

What is claimed:

1. A transmission cathode comprising:
   an X-ray transmissive material forming an X-ray window of such size that X rays will be emitted through the material; and
   at least one electron emitter affixed to a surface of the X-ray window.

2. A transmission cathode X-ray tube for the generation of X rays comprising:
   an evacuated tube;
   a transmission cathode; and
   an anode.

3. A device for the generation of X rays comprising:
   an evacuated tube;
   a transmission cathode;
   an anode; and
   means for generating an electron flow that propagates from the cathode to the anode, upon the flow of electrons striking the anode, a primary stream of X rays are generated that radiates out of the evacuated tube through the transmission cathode.

4. A device, as in claim 3, wherein said tube is an enclosed tube.

5. A device, as in claim 3, wherein said tube is a pumped tube.

6. A device, as in claim 3, wherein the transmission cathode is a field emitter on a substrate, said field emitter and substrate being transmissive to X rays.

7. A device, as in claim 6, where in the field emitter is made of a diamond material.

8. A device, as in claim 3, wherein the means for generating an electron flow is an electron emitter and an accelerating potential for accelerating the emitted electrons between the cathode and the anode.

9. An X-ray fluorescence measurement system comprising:
   a transmission cathode X-ray tube for generating X rays; and
   an X-ray detector for detecting fluorescent X rays from a sample external to the X-ray tube.

10. A device for the generation of X rays comprising:
    an evacuated tube;
    a transmission cathode having a plurality of electron emitting elements;
    an anode;
    means for generating an electron flow that propagates from the cathode elements to the anode, upon the flow of electrons striking the anode X rays are generated that radiate out of the evacuated tube through the transmission cathode.

11. A device, as in claim 10, wherein the means for generating an electron flow is a plurality of electron emitters and an accelerating potential for accelerating the emitted electrons between the cathode and the anode.

12. A device for the generation of X rays comprising:
    a evacuated tube;
    a transmission cathode having a plurality of electron emitting elements;
    an anode further comprised of a plurality of electrically conducting elements;
    means for generating an electron flow that propagates from the cathode to elements of the anode, upon the flow of electrons striking a particular element of the plurality of electrically conducting elements of the anode X rays of a predetermined frequency are generated that radiate out of the evacuated tube through the transmission cathode; and
    means for controlling the selection of a particular element of the plurality of electrically conducting elements of the anode.

13. A device, as in claim 12, wherein means for controlling the selection of a particular element of the plurality of electrically conducting elements of the anode is a switching device that selectively biases a predetermined element of the anode with an accelerating potential between the cathode and the anode.

14. A device, as in claim 12, wherein means for controlling the selection of a particular element of the plurality of electrically conducting elements of the anode is an electronic device for selectively gating electron emitting elements from the plurality of electron emitting elements of the cathode so as to allow emitted electrons to flow to a predetermined element of the anode, of the plurality of anode elements, as determined by an electric field within the device, a plurality of such anode elements having an accelerating potential between the cathode and the anode.

15. A method for generating X rays comprising the steps of:
    generating an electron flow from a transmission cathode;
    exciting X rays when said electron flow strikes an anode; and
    radiating said X rays through the transmission cathode to a sample.

16. A gatable transmission cathode comprising:
    an X-ray transmissive material forming an X-ray window of such size that X rays will be emitted through the material;
    a plurality of electron emitters affixed to a surface of the X-ray window; and
    means for gating the electron emitters so as to control an emitted electron current.

17. A gatable transmission cathode having rows comprising:
    an X-ray transmissive material forming an X-ray window of such size that X rays will be emitted through the material;
    a plurality of electron emitters affixed to a surface of the X-ray window disposed in a plurality of rows;
    means for gating the electron emitters so as to control an emitted electron current; and
    means for selecting a predetemined row of electron emitters of the plurality of rows of electron emitters.

18. A device, as in claim 17, wherein the means for gating the electron emitters so as to control an emitted electron current is a plurality of gate electrodes, each gate electrode being disposed to gate a single row of the plurality of rows of electron emitters.

19. A device, as in claim 17, wherein the means for selecting a predetemined row of electron emitters of the plurality of rows of electron emitters is an electronic circuit for applying a gate voltage to the gate electrode of the selected row of the cathode so as allow emitted electrons to flow from the selected row.

20. A gatable transmission cathode having an array comprising:
    an X-ray transmissive material forming an X-ray window of such size that X rays will be emitted through the material;
    a plurality of electron emitters affixed to a surface of the X-ray window arranged in an array;
    means for selecting a predetemined electron emitter of the plurality of electron emitters; and
    means for gating the selected electron emitter so as to control an emitted electron current.

21. A device, as in claim 20 wherein the means for selecting a predetemined electron emitter of the plurality of electron emitters is an electronic device for supplying a gate voltage to the gating means so as allow electrons to be emitted.

22. A gatable transmission cathode, as in claim 20 further comprising a means for scanning the electron emitters of the transmission cathode.

23. A gatable transmission cathode, as in claim 21, wherein the means for scanning the electron emitters of the transmission cathode is electronic circuitry for selecting and gating electron emitters in an ordered sequence.

24. A device, as in claim 20, wherein the means for gating the electron emitters so as to control an emitted electron current is a plurality of gate electrodes, each gate electrode being disposed to deliver a voltage contributing to the gating of at least one electron emitter, the gating of any invividual electron emitter being determined by the sum of the voltages contributed by all gate electrodes disposed to deliver a voltage to that electron emitter.

25. An electron probe system for generating X rays comprising:
   an evacuated enclosure containing;
      a gatable transmission cathode;
      an anode; and
      a facility for holding a sample in electrical contact with the anode, in a position where it can be struck by accelerated electrons generated by the transmission cathode;
   means for scanning the electron emitters of the transmission cathode; and
   a detector for detecting X rays emitted by the anode and sample.

26. An electron probe for generating X rays, as in claim 25, further comprising a means for deflecting electrons on their trajectory between the transmission cathode and the anode and between the transmission cathode and the sample.

27. An electron probe, as in claim 26, wherein the means for deflecting electrons are deflection electrodes supplied with an electrical potential.

28. A transmissive anode electron probe comprising:
   an evacuated tube containing;
      a gatable transmission cathode; and
      an anode transmissive to electrons;
   whereby a sample may be located outside of the evacuated tube in a position where it can be struck by electrons generated by the transmission cathode and transmitted by the anode; and
   means for scanning the electron emitters of the transmission cathode.

29. A transmissive anode X-ray probe comprising:
   an evacuated tube containing;
      a gatable-transmission cathode; and
      an anode transmissive to X rays;
   whereby a sample may be located outside of the evacuated tube in a position where it can be struck by X rays generated by the transmissive anode; and
   means for scanning the electron emitters of the transmission cathode.

30. A collimator imager comprising;
   a transmission cathode X-ray tube; and
   a collimator allowing only those X rays forming an image of the transmission cathode X-ray tube to reach the image location.

31. A scannable cathode comprising:
   a plurality of electron emitters affixed to a surface of a substrate;
   means for selecting a predetermined electron emitter of the plurality of electron emitters; and
   means for gating the selected electron emitter so as to control an emitted electron current.

32. A scanning electron imager comprising:
   an evacuated enclosure further comprising;
      a scannable cathode for generating electron emissions;
      an anode; and
      an electron detector; and
   means for generating an electron flow that propagates from the cathode to the anode.

33. A scanning electron imager, as in claim 32, further comprising a means for deflecting electrons on their trajectory between the scannable cathode and the anode.

34. A scanning electron imager, as in claim 32, further comprising a means for focusing electrons on their trajectory between the scannable cathode and the anode.

35. A scanning electron imager, as in claim 32, further comprising a means for retarding electrons on their trajectory between the anode and the electron detector.

36. A method of constructing a transmission cathode comprising the steps of:
   selecting an X-ray transmissive material to form an X-ray window of such size that X rays will be emitted through the material; and
   affixing at least one electron emitter to a surface of the X-ray window.

37. A monochromatic X-ray source comprising:
   a transmission cathode X-ray tube; and
   at least one asymmetrically diffracting X-ray optical element.

* * * * *